United States Patent

Tsuchiya et al.

[11] Patent Number: 5,960,106
[45] Date of Patent: *Sep. 28, 1999

[54] SAMPLE INSPECTION APPARATUS AND SAMPLE INSPECTION METHOD

[75] Inventors: Hideo Tsuchiya, Kawasaki; Toru Tojo, Kanagawa-ken; Mitsuo Tabata; Toshiyuki Watanabe, both of Yokohama; Eiichi Kobayashi, Tokyo, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/413,704

[22] Filed: Mar. 30, 1995

[30] Foreign Application Priority Data

Mar. 31, 1994 [JP] Japan .................................. 6-063760
Mar. 20, 1995 [JP] Japan .................................. 7-060594

[51] Int. Cl.⁶ .................................................... G06K 9/00
[52] U.S. Cl. .......................... 382/144; 382/149; 382/274
[58] Field of Search ................................ 382/149, 145, 382/144, 141, 274, 209, 217, 219, 147, 148, 205; 348/87, 126; 356/237.4, 237.5, 236.6, 375, 376; 250/559.4, 559.41, 559.42, 559.43, 559.44, 559.45, 559.46; 438/14–18

[56] References Cited

U.S. PATENT DOCUMENTS

| | | | |
|---|---|---|---|
| 3,887,762 | 6/1975 | Uno et al. ................. | 348/126 |
| 4,589,140 | 5/1986 | Bishop et al. ............ | 382/148 |
| 4,628,531 | 12/1986 | Okamato et al. ....... | 382/144 |
| 4,633,504 | 12/1986 | Wihl ........................ | 382/144 |
| 4,731,855 | 3/1988 | Suda et al. ................ | 382/8 |
| 4,791,586 | 12/1988 | Maeda et al. ........... | 364/491 |
| 5,146,509 | 9/1992 | Hara et al. ................ | 382/8 |
| 5,619,429 | 4/1997 | Aloni et al. .............. | 364/552 |
| 5,744,381 | 4/1998 | Tabata et al. ............ | 438/16 |

FOREIGN PATENT DOCUMENTS

| 61-082107 | 4/1986 | Japan . | |
| 1-40489 | 8/1989 | Japan .................... | H01L 21/30 |

OTHER PUBLICATIONS

Recticle, Mask Defect Inspection System, Densi Zairyo, pp. 55–59, Toru Azuma, Jun. 1982.

*Primary Examiner*—Jose L. Couso
*Assistant Examiner*—Brian P. Werner
*Attorney, Agent, or Firm*—Finnegan, Henderson, Farabow, Garrett & Dunner, L.L.P.

[57] ABSTRACT

In a method of inspecting a sample on which a pattern relating to fabrication of a semiconductor device is formed, there are provided a light radiation unit, an acquiring unit, a storage unit, a template, a calculation unit, a correction unit, a defect detection unit and an output unit. Pinhole shape data to be detected of the pattern is stored in the template. The calculation unit calculates the degree of coincidence between the pinhole shape data stored in the template and the measured image data stored in the storage unit in units of a predetermined amount of data. The correction unit corrects a portion of the measured image data corresponding to a value of the degree of coincidence exceeding a second predetermined value in units of the predetermined amount of data, when the degree of coincidence obtained by the calculation unit has exceeded a first predetermined value, thereby correcting the portion of the measured image data including the detected pinhole. The defect detection unit detects a defect in the pattern on the basis of the corrected measured image data portion including the pinhole, which is obtained by the correcting unit, and the measured image data.

28 Claims, 22 Drawing Sheets

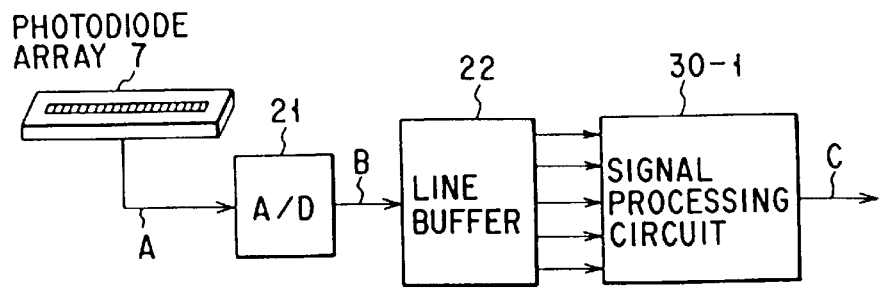
F I G. 2
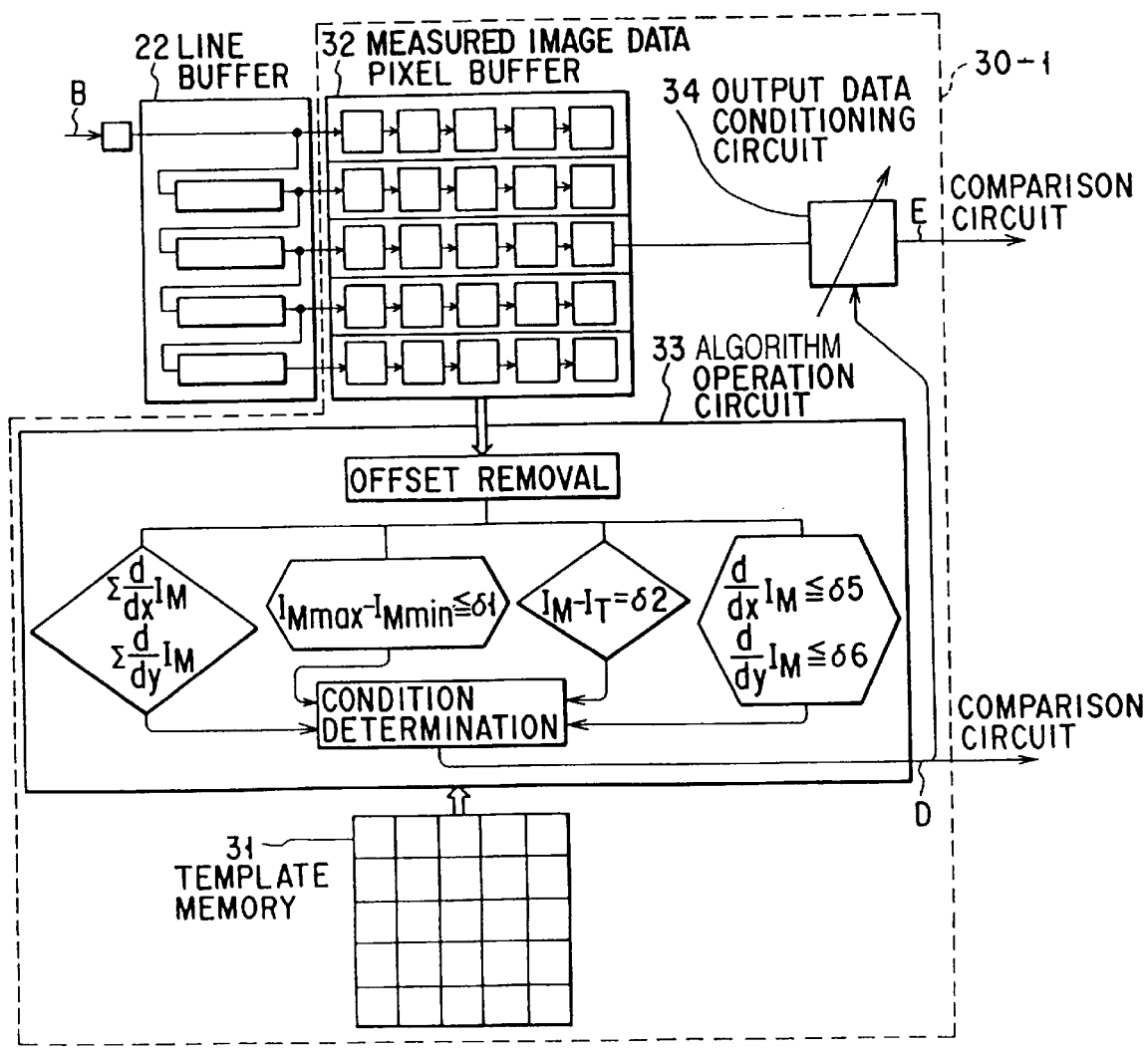
F I G. 3

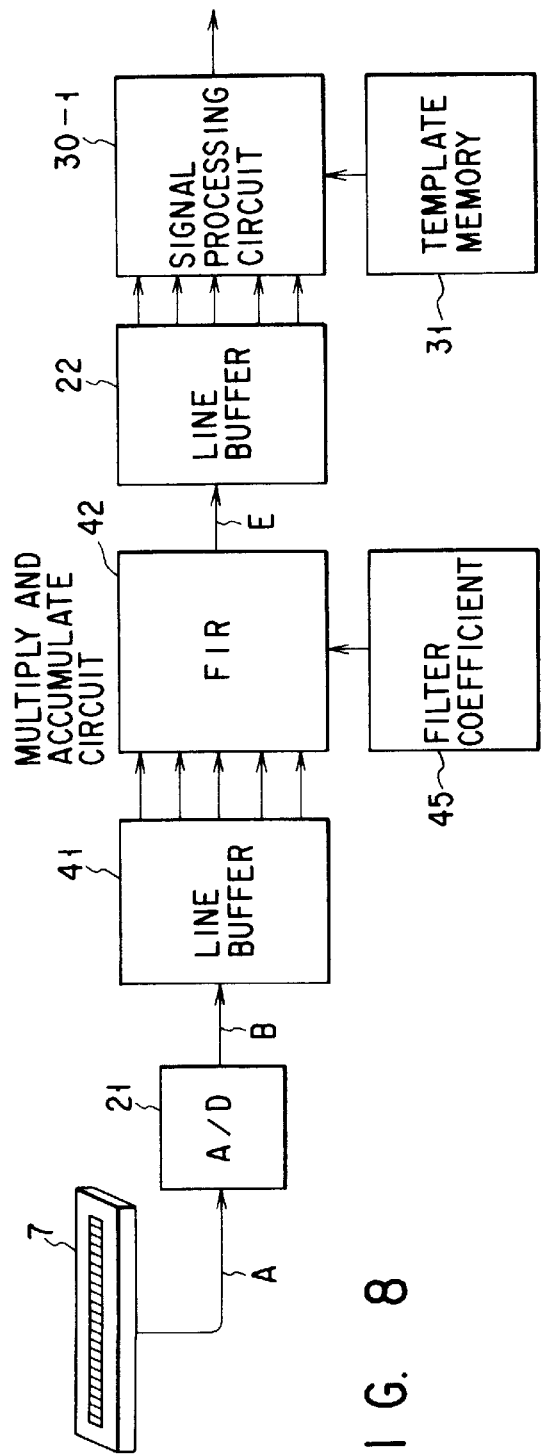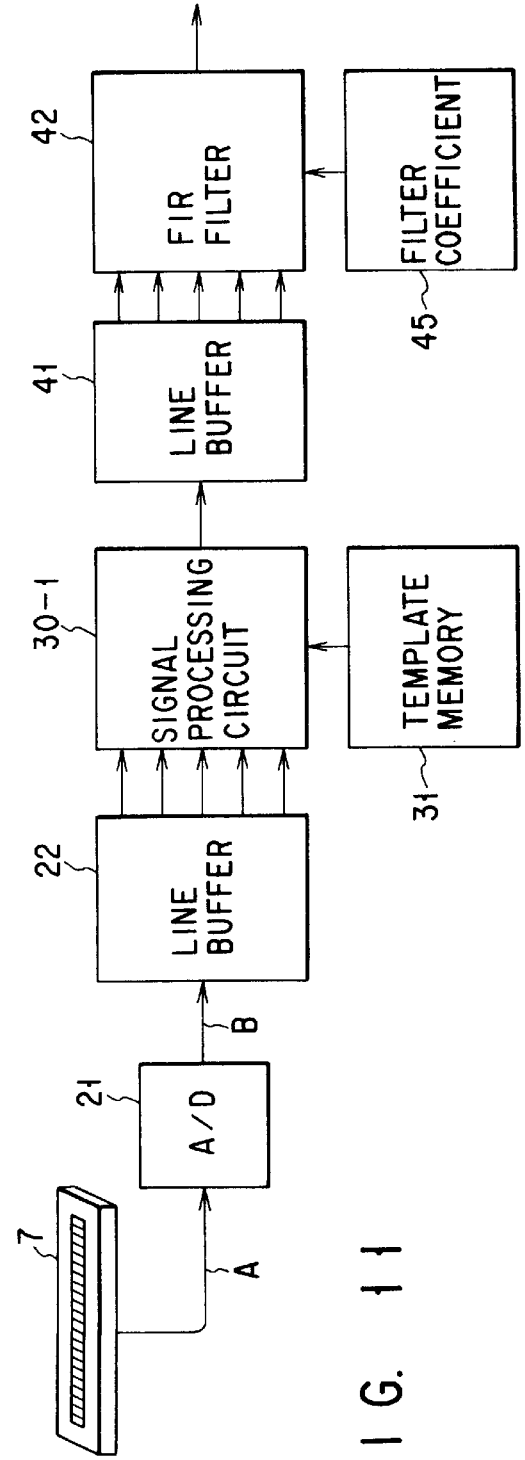
F I G. 8
F I G. 11

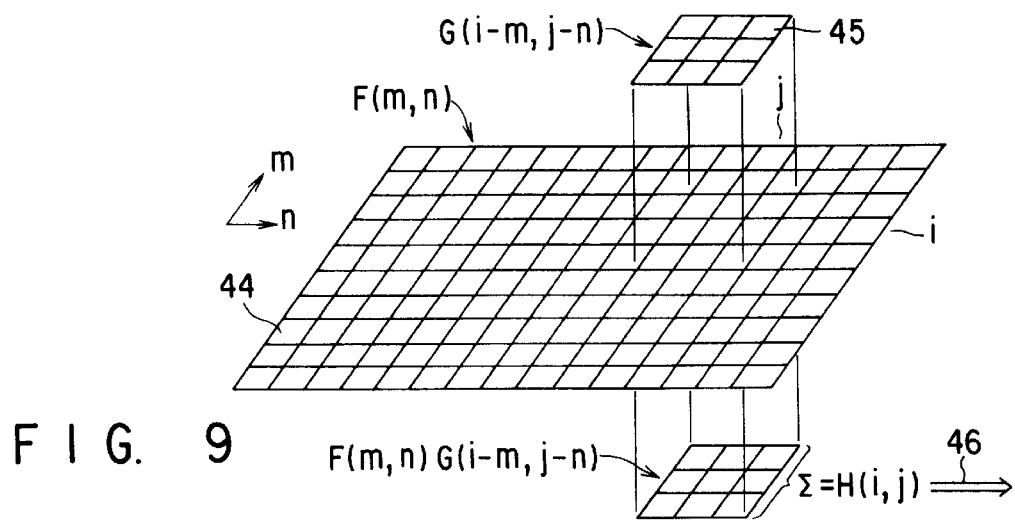
FIG. 9
FIG. 10
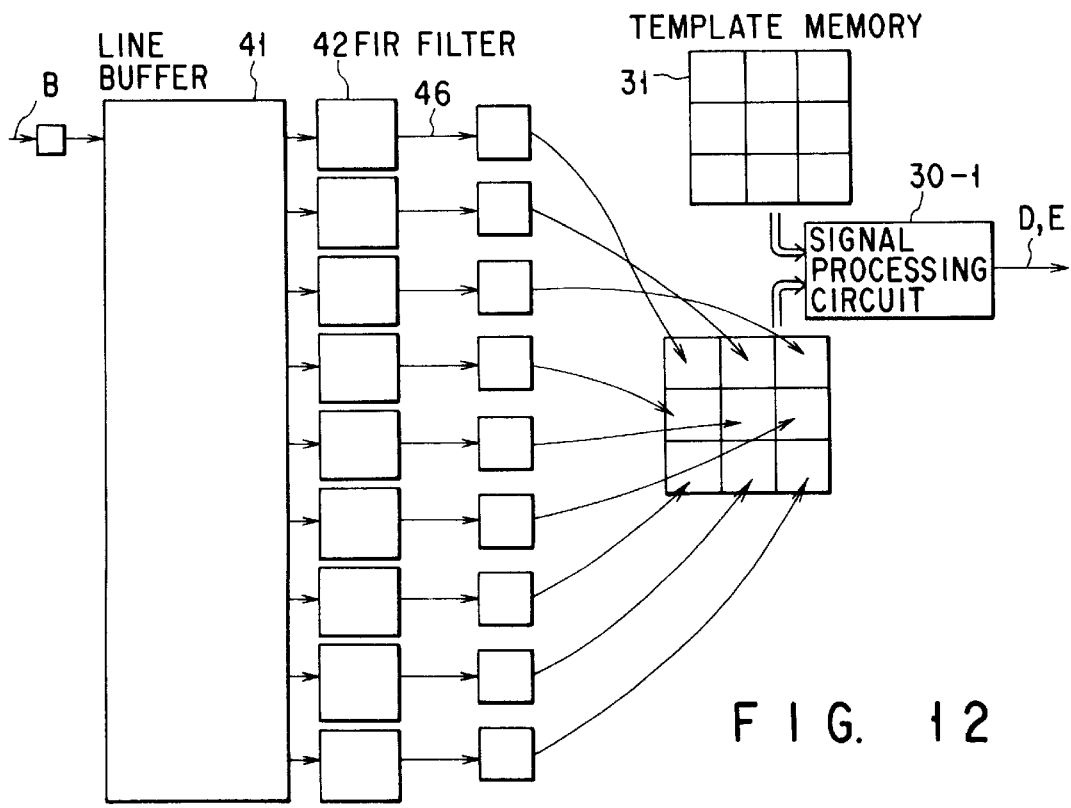
FIG. 12

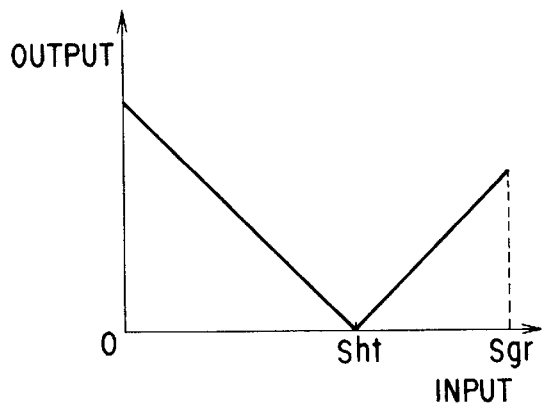
F I G. 28
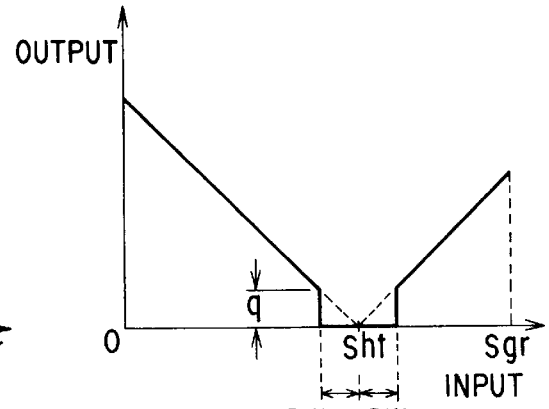
F I G. 29
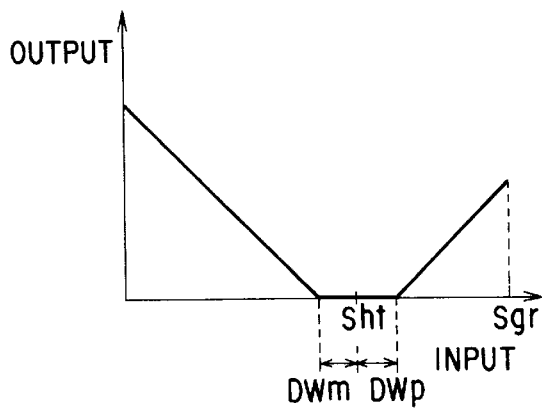
F I G. 30
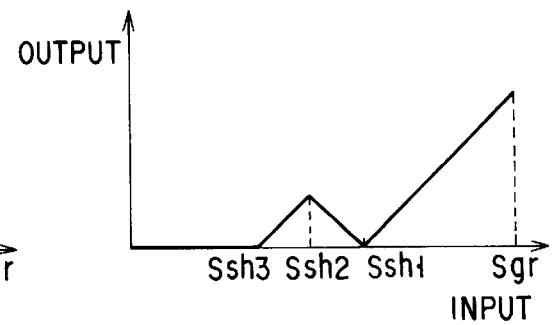
F I G. 31
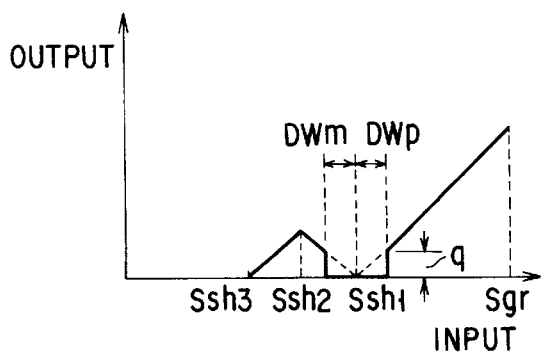
F I G. 32
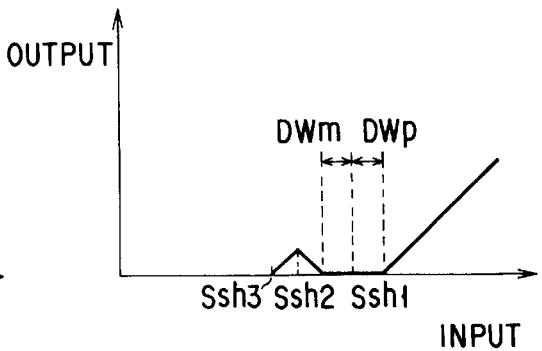
F I G. 33

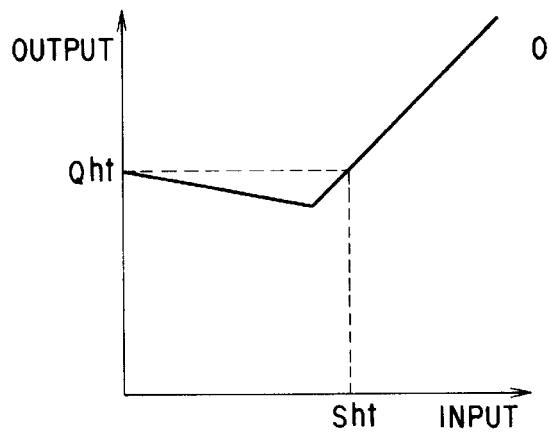
F I G. 34
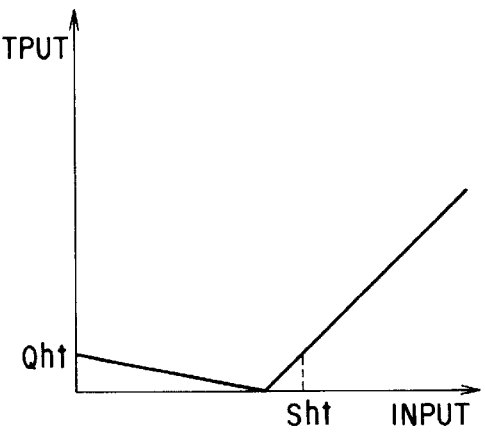
F I G. 35
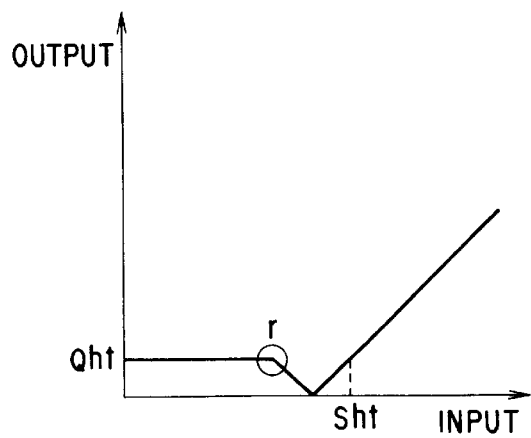
F I G. 36
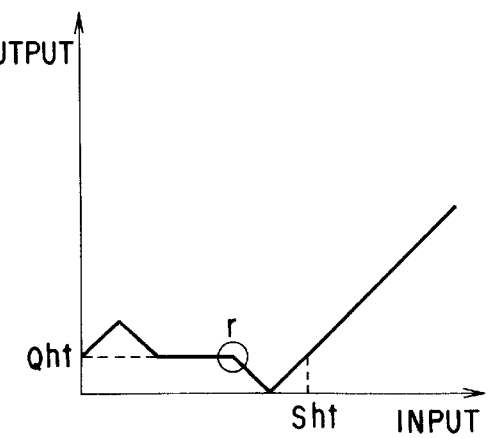
F I G. 37

SAMPLE INSPECTION APPARATUS AND SAMPLE INSPECTION METHOD

BACKGROUND OF THE INVENTION

1. Field of the Invention

The present invention relates to a sample inspection apparatus and a sample inspection method for inspecting samples such as a photomask, a wafer, a reticle and a liquid crystal substrate, on which patterns relating to fabrication of semiconductor devices are formed.

2. Description of the Related Art

A main cause in a decrease of the yield of large scale integration (LSI) circuits is a defect in a photomask used in fabricating semiconductor devices by means of lithography. With recent development of LSI, a pattern formed on a photomask has become finer. Accordingly, the dimensions of a defect to be detected are very small. Under the circumstances, apparatuses for inspecting such defects, i.e. sample inspection apparatuses such as a defect inspection apparatus and a pattern inspection apparatus have been widely developed and put into practical use.

A demand for a stricter inspection has increased. For example, in order to exactly detect a very small defect by a defect inspection apparatus, the relationship between a signal level obtained at the time of observing a defect and a noise level in a detection system is very important. In other words, a gain of an optical apparatus or a signal acquiring means must be sufficiently high over a spatial frequency range which is wide enough to detect the defect.

The modulation transmission characteristics of the optical apparatus is determined by a numerical aperture (NA) for determining the amount of optical information needed to form an image, the average wavelength of used light, and the degree of cohesion. If the NA is increased, the spatial frequency band permitting optical resolution increases but the focal depth decreases accordingly. In addition, if an area for observation is unchanged, the size in structure increases. It thus appears that the limit of the NA is, in fact, about 0.8.

To decrease the optical wavelength is effective means for detecting a very small defect. However, since the sensitivity of a detection sensor decreases in a short wavelength region, a custom-made expensive sensor is required and there are many practical problems. In a method of increasing the cohesion of wavelength of light to be used, the MTF relating to intermediate frequencies can be improved but the level of a very weak signal is further decreased.

Besides, there has recently been proposed a method of improving a signal which is degraded due to various factors in an optical defect inspection apparatus. In this method, a measured image signal is subjected to proper filtering (Jap. Pat. Appln. KOKAI Publication No. 61-82107). This method is very effective when an S/N of a certain level is maintained. However, the method of improving the degraded signal emphasizes noise consequently. If this method is actually adopted, an inspection apparatus would output many pseudo-defects (defect-free portions are erroneously determined to be defective portions). Even if this method is adopted, it is necessary to decrease unnecessary noise by some means.

On the other hand, the conventional mask defect inspection apparatus generally adopts two defect inspection methods: 1) two chips with the same pattern are observed by different detection means, and a difference therebetween is detected by comparison by a proper defect detection algorithm, and 2) a chip with a pattern is observed by detection means and the observation result is compared with pattern design data by a proper defect detection algorithm, thereby finding a defect.

In the case of the former, since the two chips with the same pattern are individually observed, the same defect, if being present, cannot be detected.

In the case of the latter, the observation result is compared with the design data, such a problem does not occur. Examples of the inspection apparatus using design data are disclosed in a prior art document (VSLI High Precision Total Automatic Reticle Inspection Apparatus, Electronic Material, September 1983, p. 47) or Jap. KOKU Patent No. 1-40489.

It is desirable that design data used at the time of producing (writing) a reticle coincides with design data to be input to the inspection apparatus to execute an inspection. A highly efficient system can be constructed if these two design data are used in a writing apparatus or an inspection apparatus which is designed and manufactured under the condition that these two design data coincide.

In the meantime, most of the conventional masks to be inspected are formed such that an un-transparent chrome is deposited on a transparent glass, a pattern is written, and the resultant is subjected to etching. Such masks have ideal optical transmissivity of about 100% and about 0%.

In the meantime, in order to improve resolution characteristics of an exposure apparatus, various phase-shift masks have been devised and put to practical use. Among the masks, a mask called "half-tone mask" is prospective because of easy pattern design. The half-tone mask uses a semi-transparent film of silicon nitride, etc. in place of a conventional chrome film. As regards this type of mask, too, a defect in a pattern formed of a half-tone film needs to be inspected, like a conventional chrome mask. However, the transmissivity of the semi-transparent film ranges from about 10% to about 70% or more in some cases. Consequently, sufficient optical contrast cannot surely be obtained, the resolution lowers, and precise defect detection cannot be performed.

In a possible application by a mask designer or a user, a conventional chrome film and a semi-transparent half-tone film may be used in combination.

In the conventional mask inspection apparatus (of a data base comparison system), however, no consideration has been given to the combinatorial use of both films. Specifically, in a conventional defect detection algorithm in which a signal level is used for determination, only two states of a light transmission portion (glass) and a light shielding portion (chrome) are treated. For example, when a chrome/half-tone/glass mask, in which a target pattern portion is formed of a half-tone film and an outer frame is formed of a chrome film, is inspected, a half-tone level differs from a chrome level and may be determined to be defective.

Accordingly, the determination method using a signal level cannot be adopted, and a differentiation comparison method for determining a defect on the basis of light/dark differential values of observation data is adopted. However, it is difficult to set a defect determination threshold value and it is not possible to perform precise defect detection.

Furthermore, there are problems of overshoot and undershoot at the edge portion of a glass/half-tone film. In a conventional defect detection algorithm for chrome masks, such overshoot and undershoot portions are determined to be defective since they depart from an inspection standard created from an actual design pattern image.

Since such overshoot and undershoot will occur at normal edge portions, it is not possible to strictly set the threshold of the conventional defect detection algorithm. Thus, there is a concern that a very small defect to be detected may not be detected.

Under the circumstances, development of an inspection apparatus matching a half-tone mask is to be desired.

As has been stated above, the conventional sample inspection apparatus for detecting defects of patterns of a mask, a reticle, etc. is used, with the detection sensitivity enhanced to such a level as to detect no pseudo-defects or signals corresponding to noise. Moreover, various detection algorithms have been developed to enhance the defect detection ratio, but adequate detection sensitivity cannot be attained.

The pattern defects include isolated defects, edge-portion defects, corner-portion defects, etc. With respect to each defect, there are a remaining portion (a black defect) of a pattern and a missing portion (a white defect) of a pattern. In general, the conventional apparatus has different maximum defect detection dimensions for so many defects. For example, the maximum detection sensitivity of a black isolated defect is 0.3 µm, while the maximum detection sensitivity of a white isolated defect is 0.4 µm. The reason for this is that signal amplitudes of actually detected defective portions are different although the defective portions have the same dimensions. Thus, the defect detection sensitivity of the inspection apparatus is expressed ambiguously.

FIG. 21 shows transmission light output characteristics obtained when a mask formed of a half-tone film (and glass) was observed with light of a proper wavelength. FIG. 41 show transmission light output characteristics obtained when a mask formed of a combination of a chrome film and a half-tone film was observed with light of a proper wavelength Specifically, overshoot and undershoot occur at edge portions of the glass/half-tone film, or a large difference occurs between a chrome level and a half-tone level.

SUMMARY OF THE INVENTION

The present invention has been made in consideration of the above problems, and an object of the invention is to provide a pattern inspection apparatus capable of detecting a small defect which cannot be detected in the prior art, and setting the maximum detection sensitivity irrespective of the type of the defect.

Another object of the invention is to provide a defect inspection apparatus which is provided with a processing circuit for effectively pre-processing an input signal, thereby detecting, with high sensitivity, a small defect of a mask comprising a chrome film and a half-tone film in combination with use of a conventional chrome mask defect detection algorithm.

In order to achieve the above objects, there is provided a sample inspection apparatus comprising:

light radiation means for radiating light on a sample on which a pattern relating to fabrication of a semiconductor device is formed;

acquiring means for sensing the light, which has passed through the sample, thereby acquiring measured image data constituting a light transmission image of the pattern;

storage means for storing the measured image data acquired by the acquiring means;

pinhole detection means for detecting a pinhole in the pattern on the basis of the measured image data stored in the storage means, and correcting a portion of the measured image data which includes the detected pinhole;

defect detection means for detecting a defect in the pattern on the basis of the corrected measured image data portion including the pinhole, which is obtained by the pinhole detection means, and the measured image data; and output means for outputting a detection result of the defect detection means.

There is also provided a sample inspection method comprising the steps of:

radiating light on a sample on which a pattern relating to fabrication of a semiconductor device is formed;

sensing the light, which has passed through the sample, thereby acquiring measured image data constituting a light transmission image of the pattern;

storing the measured image data acquired by the acquiring step;

providing a template for storing pinhole shape data to be detected of the pattern;

calculating the degree of coincidence between the pinhole shape data stored in the template and the measured image data stored in the storing step in units of a predetermined amount of data;

correcting a portion of the measured image data corresponding to a value of the degree of coincidence exceeding a second predetermined value in units of the predetermined amount of data, when the degree of coincidence obtained by the calculating step has exceeded a first predetermined value, thereby correcting the portion of the measured image data including the detected pinhole;

detecting a defect in the pattern on the basis of the corrected measured image data portion including the pinhole, which is obtained by the correcting step, and the measured image data; and outputting a detection result of the defect detection step.

There is also provided a sample inspection method comprising the steps of:

radiating light on a sample on which a pattern relating to fabrication of a semiconductor device is formed;

sensing the light, which has passed through the sample, thereby acquiring measured image data constituting a light transmission image of the pattern;

storing the measured image data acquired by the acquiring step;

extracting a value of a center pixel of the measured image data stored in the storing step and a value of pixels surrounding the center pixel;

determining the presence of the pinhole in the pattern by the difference between the value of the center pixel extracted by the extraction step and the value of the surrounding pixels;

correcting a portion of the measured image data corresponding to the center pixel when the presence of the pinhole has determined in the determining step, thereby correcting the portion of the measured image data including the detected pinhole;

detecting a defect in the pattern on the basis of the corrected measured image data portion including the pinhole, which is obtained by the correcting step, and the measured image data; and outputting a detection result of the defect detection step.

There is also provided a sample inspection apparatus comprising:

light radiation means for radiating light on a sample on which a pattern relating to fabrication of a semiconductor device is formed;

acquiring means for sensing the light, which has passed through the sample, thereby acquiring measured image data constituting a light transmission image of the pattern;

normalizing means for normalizing the range of amplitude of the measured image data acquired by the acquiring means within a predetermined amplitude range, and adjusting the measured image data exceeding the amplitude range on the basis of the normalized measured image data, thereby correcting the measured image data acquired by the acquiring means; and defect detection means for detecting a defect in the pattern, by comparing the corrected measured image data obtained by the normalizing means and design data of the pattern.

There is also provided a sample inspection method comprising the steps of:

radiating light on a sample on which a pattern relating to fabrication of a semiconductor device is formed;

sensing the light, which has passed through the sample, thereby acquiring measured image data constituting a light transmission image of the pattern;

normalizing the range of amplitude of the measured image data acquired by the acquiring step within a predetermined amplitude range, and adjusting the measured image data exceeding the amplitude range on the basis of the normalized measured image data, thereby correcting the measured image data acquired by the acquiring step; and defect detection means for detecting a defect in the pattern, by comparing the corrected measured image data obtained by the normalizing step and design data of the pattern.

In a conventional apparatus, a highest level value of noise is detected from a measured total image data signal containing a noise component, thereby determining detection sensitivity with which no pseudo-defect occurs. Alternatively, measured total image data is subjected to a comparison algorithm provided for each apparatus, thereby determining detection sensitivity with which no pseudo-defect occurs.

It is difficult, however, to detect a small defect by the above methods.

In the apparatus and method of the present invention, attention is paid to the fact that a characteristic signal is observed if a small defect is observed in units of a predetermined amount of measured image data, e.g. a data unit of about 5×5 pixels or 7×7 pixels. This characteristic signal is held in the inspection apparatus as a template, and the template is made to operate upon the measured image data Thus, the degree of coincidence between the data of the template and the measured image data is found. A coincident portion is determined as a defect. The signal of the coincident portion is modified, e.g. amplified or attenuated, thereby enhancing the apparent S/N. The modified signal is sent to the following-stage comparison circuit, and the defective portion is detected and determined. By this method, the defect can be detected with higher sensitivity than in the prior art.

In this manner, in the present invention, the measured image data is subjected to the operation of one or more templates and the degree of coincidence between the measured image data and prepared template data is found by a proper algorithm. If the degree of coincidence is very high, part of the measured image data is corrected and the signal of the defective portion is improved, i.e. amplified or attenuated. The improved signal is sent to the following-stage defect determination process, e.g. to the comparison circuit. Thus, a small defect which cannot be detected by the conventional apparatus can be detected.

For example, a part of a small defect to be detected or a part to be detected as pseudo-defect is measured in advance, and a template functioning as a standard is prepared and stored. The template data may be obtained by simulation. The number of templates is one or more. The measured image data is subjected to the operation of the template and the entire measured data is scanned to calculate the degree of coincidence. Part of the measured image data of an area (or a part) at which the degree of coincidence is very high is rewritten. The algorithm for finding the degree of coincidence may be properly chosen in accordance with the quality (S/N) of the signal of the apparatus.

By the above method, only the signal of the defective portion is processed, while maintaining the noise level, and the signal of the defective portion is converted to measured image data with a high S/N. Alternatively, an unnecessary noise component is reduced. Thereby, the signal of the defective portion can be converted to measured image data with a high S/N. Accordingly, a small defect which cannot be detected in the prior art can be detected.

Since the defect detection sensitivity can be enhanced by the signal processing method, there is no need to increase the NA of the observation system unnecessarily. Thus, no problem arises with respect the fabrication of a lens. In addition, there is no decrease in focal depth due to a higher NA, or no problem due to shorter wavelength. Therefore, remarkable practical advantages can be brought about.

With regards to the sample on which a pattern used in fabricating a semiconductor device is formed, it is known that if the small defective portion of the measured image data is observed in detail, pixels of a certain energy level surround a peak of the defect. Thus, if not only the value of the pixel corresponding to the peak of the defect but also the energy of the pixels surrounding the peak pixel is utilized, means for an improved defect inspection can be provided.

As compared to a noise level signal having a random value, the small defective portion is divided into a center portion of the image data and a ring-like portion surrounding the center portion. The values of both portions are compared, thereby distinguishing the signal of a random noise level from the signal of the defective portion. Thus, the portion associated with the signal of the defective portion is determined as being defective or the signal of the defective portion is modified, e.g. increased or decreased, thereby enhancing the apparent S/N. The modified signal is sent to the following-stage comparison circuit, and the defective portion is detected. By this method, the defect can be detected with higher sensitivity than in the prior art.

By the above method, only the signal of the defective portion is processed, while maintaining the noise level, and the signal of the defective portion is converted to measured image data with a high S/N. Alternatively, an unnecessary noise component is reduced. Thereby, the signal of the defective portion can be converted to measured image data with a high S/N.

Accordingly, a small defect which cannot be detected in the prior art can be measured. In addition, since the defect detection sensitivity can be enhanced by the signal processing method, there is no need to increase the NA of the observation system unnecessarily. Thus, no problem arises with respect the fabrication of a lens. In addition, there is no decrease in focal depth due to a higher NA, or no problem due to shorter wavelength. Therefore, remarkable practical advantages can be brought about.

Furthermore, according to the apparatus and method of the present invention, even in the case of inspecting a half-tone mask, output profiles of pattern edge portions of observation data and inspection reference data can be made to coincide exactly. Thus, the possibility of occurrence of a pseudo-defect can be reduced to a minimum. On the other hand, an undershoot component of the small defective portion, which accompanies the target small defect, is inverted to the positive side and an effective signal for comparison determination is added. Therefore, the detection sensitivity can be increased. In this case, the conventional algorithm can be used as it is. Half-tone masks having different characteristics can be used by performing normalizing operations matching with the different characteristics. Therefore, a highly practical sample inspection apparatus as well as a highly practical sample inspection method can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a conceptual view illustrating a step of processing a sensor signal in the first embodiment;

FIG. 3 is a block diagram illustrating a concept of signal processing in the first embodiment;

FIG. 8 is a block diagram showing a second embodiment of the invention using an FIR filter;

FIG. 9 is a view for explaining the operation of the FIR filter;

FIG. 10 shows an example of an FIR filter coefficient for smoothing;

FIG. 11 is a block diagram showing a third embodiment of the invention wherein an FIR filter is connected at the following stage;

FIG. 12 is a block diagram showing a fourth embodiment of the invention wherein a line buffer is connected;

FIGS. 28 to 37 are input/output characteristics diagrams of offset superimposition circuits;

DETAILED DESCRIPTION OF THE PREFERRED EMBODIMENTS

Embodiments of the present invention will now be described with reference to the accompanying drawings.

(Embodiment 1)

Figure 1:
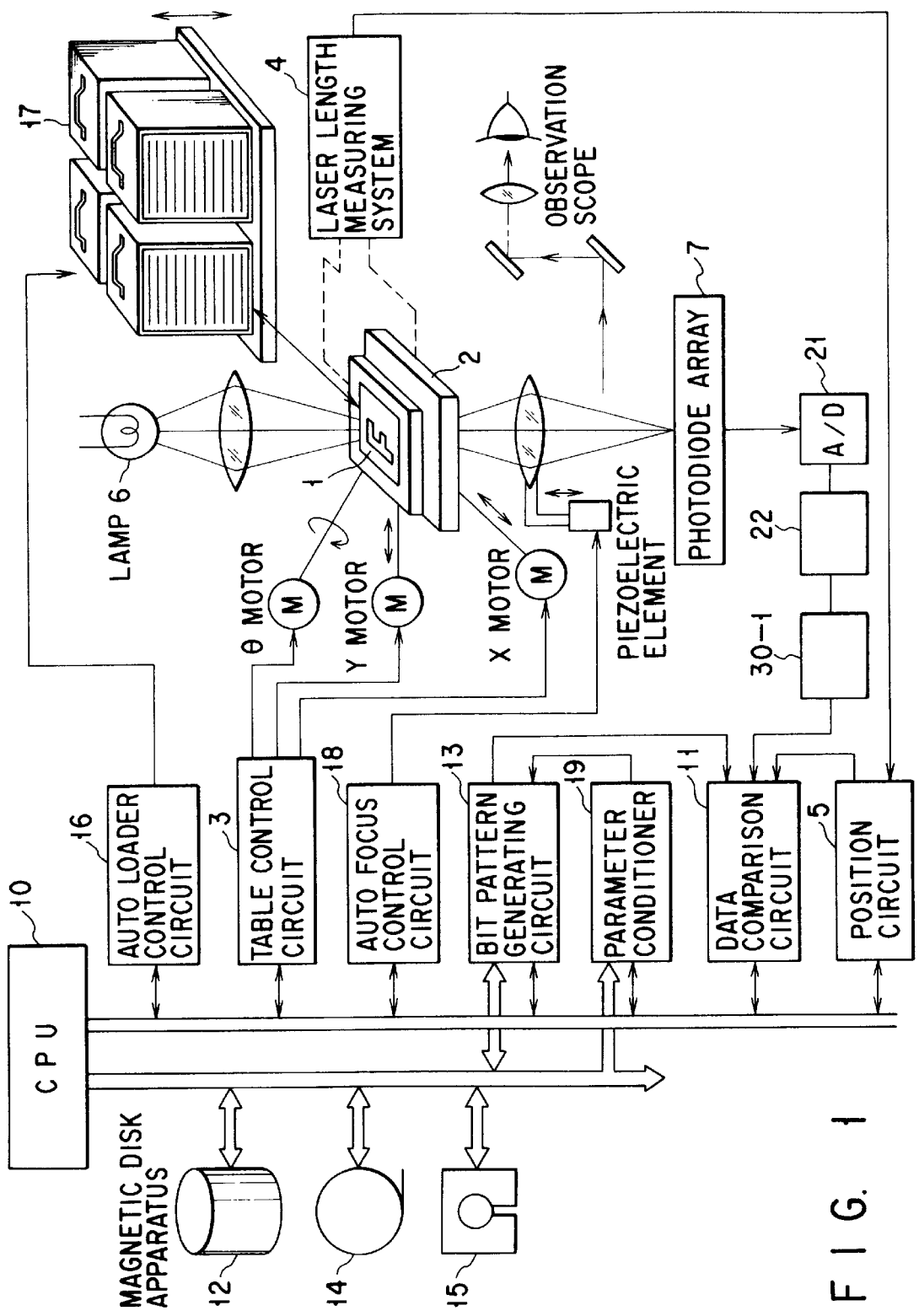
FIG. 1 schematically shows the structure of a pattern inspection apparatus according to a first embodiment of the present invention.

FIG. 1 schematically shows the structure of a pattern defect inspection apparatus according to a first embodiment of a sample inspection apparatus of the present invention. The basic structure of this apparatus is the same as that of a typical conventional apparatus. This apparatus differs from the conventional apparatus with respect to a signal processing unit comprising an A/D converter 21, a line buffer circuit 22 and a signal processing circuit 30-1 (all described later).

A sample table 2 for supporting a photomask 1 or a sample, on which a pattern used in fabricating a semiconductor device is formed, is moved by a table control circuit 3 in response to a command from a computer 10 in an X-direction, Y-direction and θ-direction. The coordinates of the sample table 2 are measured, for example, by sending an output from a laser length measuring system 4 to a position circuit 5. A light radiation unit or a light source 6 is situated above the sample table 2. Light from the light source 6 is radiated on the photomask 1, and transmission light emanating from the photomask 1 is focused on a light-receiving surface of a signal detection unit or a photodiode array 7. The photodiode array 7 is formed by linearly arranging light sensors.

When the sample table 2 is successively moved in one axial direction (Y-axial direction in FIG. 1), a measurement signal A corresponding to a pattern to be tested of the photomask 1 is detected by the photodiode array 7. The measurement signal A is sent to a data comparison circuit 11.

On the other hand, design data is stored in an external storage apparatus (magnetic disk apparatus) 12 such that the entire area to be inspected is divided into non-overlapping strip-like areas. The strip-like design data is sent to a bit pattern generating circuit 13 in units of an area. Data generated from the bit pattern generating circuit 13 is delivered to the comparison circuit 11 and compared with the measurement signal A by a proper comparison algorithm. If the measurement signal A differs from the design data, a defect is detected.

In FIG. 1, reference numeral 14 denotes a magnetic tape apparatus; 15 a floppy disk; 16 an auto loader control circuit; 17 an auto loader; 18 an auto focus control circuit; and 19 a parameter conditioner.

As is shown in FIG. 2, the defect inspection apparatus of this embodiment is characterized in that an output A from the photodiode array 7 is converted to a digital signal B by the A/D converter 21 and the digital signal B is subjected to signal processing in the buffer circuit 22 and signal processing circuit 30-1 (described later in detail).

The main parts of the present embodiment will now be described. As is shown in FIG. 3, the signal processing circuit 30-1 comprises a template memory 31, a measured image data pixel buffer 32, an algorithm operation circuit 33, and an output data conditioning circuit 34.

The lines of the line buffer 22 which stores the A/D converted observation signals B successively are FIFO (First in First out) memories of plural stages corresponding to the number of pixels of the photodiode array 7. The number of storage lines is determined by the size of an n×n matrix of the template memory 31, and the lines are connected to one another in a chain-like manner.

The measured image data pixel buffer 32 comprises an n-number of first-order buffers formed by connecting in series an n-number of stages of registers corresponding to the n×n matrix of the template memory 31. Image data is delayed in the line buffer 22 on a line-by-line basis and the delayed image data synchronized on a line-by-line basis is input in parallel to the observation data pixel buffer 32.

The algorithm operation circuit 33 actuates the template memory 31 and measured image data pixel buffer 32 and calculates the degree of coincidence of signals output therefrom. If the degree of coincidence is high, a flag D indicating the presence of a defect corresponding to the template memory 31 is set at the associated portion. The flag D is sent to the comparison circuit 11 in the rear stage, and a signal corresponding to a very small defect which is missing in the determination of the defect can be surely detected.

The flag D is delivered to the output data conditioning circuit 34. In the output data conditioning circuit 34, a signal corresponding to a defective portion of the image data is amplified or attenuated by a signal amplifying/attenuating means (i.e. means for rewriting the value of, e.g. a signal corresponding to a center portion of the measured image data pixel buffer 32), thereby enhancing the apparent S/N. The corrected data E produced from the output data conditioning circuit 34 is sent to the comparison circuit 11 in the following stage.

Since the defective portion of the image data is rewritten by the output data conditioning circuit 34, the defective signal is amplified or a noise portion is attenuated. Thus, a very small defect which has not been detected in the prior art can be detected by the comparison circuit 11 in the following stage by using the conventional comparison algorithm.

In FIG. 3, the data E from the output data conditioning circuit 34 and the data (flag D) from the algorithm operation circuit 33 are both delivered to the comparison circuit 11. However, in some instances only one of these data is delivered for comparison by comparison circuit 11.

The template memory 31 is a part for storing a signal pattern of a characteristic small defect. A plurality of template memories 31 are prepared, if necessary. The signal of the small defect may be stored in the template memory 31 such that the numerical value of each part is determined by simulation and loaded down in the template memory 31 from the control computer 10.

Figure 4:
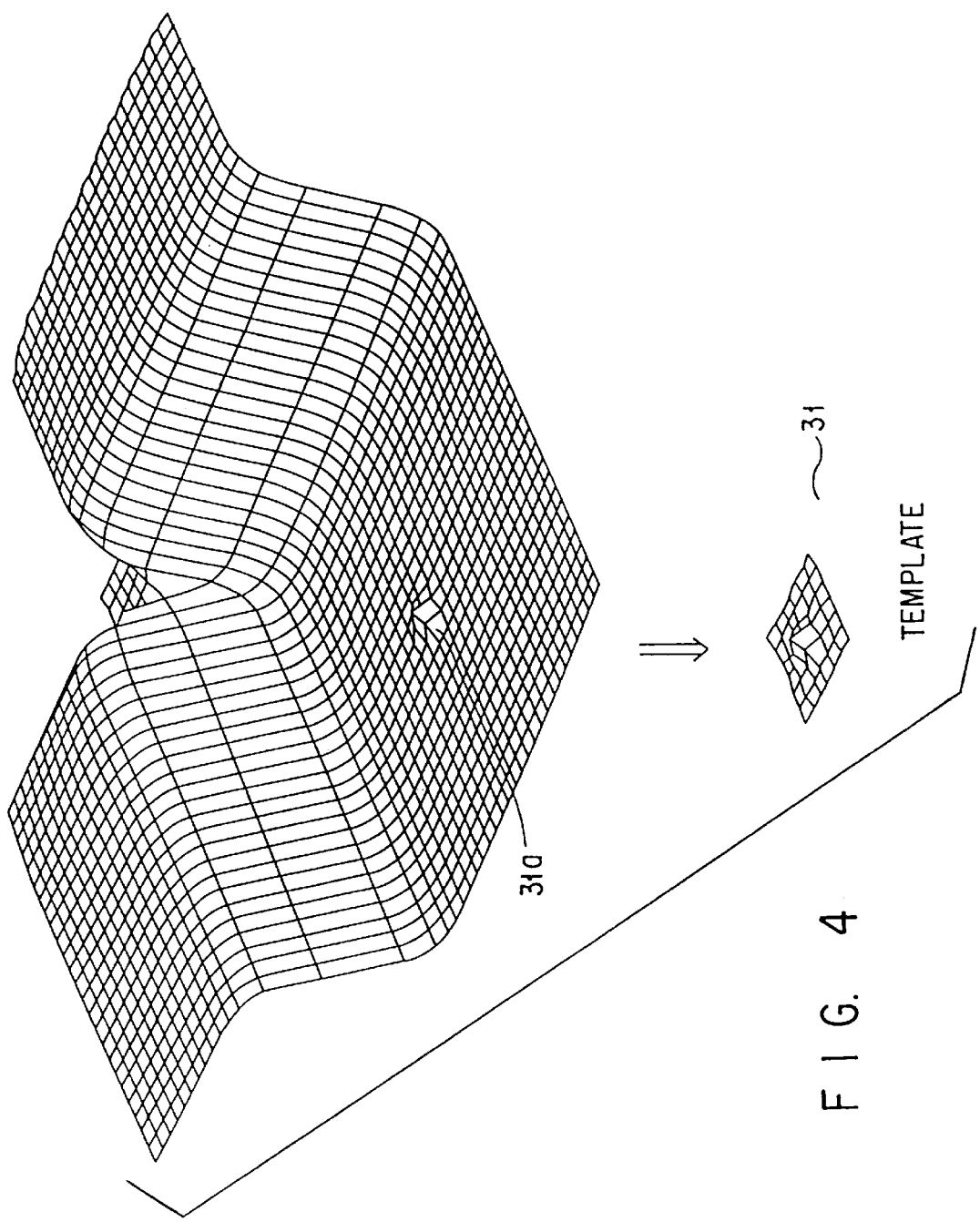
FIG. 4 shows an example of a defect to be detected.

More specifically, it is desirable to measure a small defective portion to be actually detected, as shown in FIG. 4, cutting out a portion 31a corresponding to the n×n matrix of the template memory 31, and store the portion 31a in the template memory 31. The reason for this is that the actually measured signal is influenced by image degradation due to an optical system or a CCD sensor, or degraded image measurement due to movement of the table at the time of inspection and therefore more exact small defect detection can be performed on the basis of the actually measured signal.

A specific operation of increasing the signal of the defective portion will now be described with reference to FIG. 5. The line buffer 22, measured image data pixel buffer 32, template memory 31 and auxiliary template memories 35 are connected to a maintenance bus 36. The maintenance bus 36 is connected to the host computer 10 via a host computer interface 37.

Each circuit connected to the maintenance bus 36 can be set in various modes from the host computer 10. For example, the auxiliary template 35 and the actually used template 31 may be interchanged, the data within the template may be rewritten, or the data remaining in the line buffer 22 or measured image data pixel buffer 32 may be read out at a certain time point. In addition, the following functions may be set.

In order to sample an actual measurement signal and store it in the template memory 31, a signal corresponding to an area including a target small defective portion is stored in the buffer 22, the stored signal is read out by the host computer, a predetermined n×n matrix is cut out, and the matrix is written in the template memory 31. In order to store the small defective portion in the line buffer 22, coordinates synchronized with the sensor scan is read by the laser length measuring system and the coordinate value of the defective portion is triggered.

The size of the template memory 31 should sufficiently be 5×5 pixels to 10×10 pixels. However, the size of the memory 31 may be properly chosen in accordance with the magnification of the optical system or the magnitude of a beam spot expansion function. In addition, since the same apparatus may, in some cases, be used with a different optical magnification in order to change detection sensitivity, the size of the template memory 31 may need to be switched on an as-needed basis.

The processing step of determining coincidence/non-coincidence of signals from the template memory 31 and measured image data pixel buffer 32 in the algorithm operation circuit 33 will now be described with reference to FIGS. 3 and 5. In the following description, 5×5 pixels will be employed for the purpose of simplicity.

Each time a clock signal is applied to the circuit, two-dimensional distribution data of the measured image data pixel buffer 32 is shifted successively on a pixel-by-pixel basis (to the right in the figures). In each cycle, each matrix element of the measured image data pixel buffer 32 and an associated matrix element of the template memory 31 are scanned, and the degree of coincidence therebetween is calculated.

There are various methods of calculating the degree of coincidence between the measured image data pixel buffer 32 and template memory 31. An example of the method will now be described. In the following formulae, $I_T(i,j)$ and $I_M(i,j)$ indicate, respectively, data of (i,j) coordinate of the template and measurement image data corresponding to the template data.

(1) $I_M(i,j) \leftarrow I_M(i,j) - I_M min(i,j)$

A step of eliminating an offset component, in which a minimum value of measurement image data in the target n×n pixels is $I_M min(i,j)$.

(2) verify $\{I_M max(i,j) - I_M min(i,*) \leq \delta 1\}$

A step of confirming that a difference between minimum value $I_M min(i,j)$ of measurement image data in the target n×n pixels and maximum value $I_M max(i,j)$ is within a set range ($\delta 1$).

(3) verify $\{\Sigma |I_M(i,j) - I_T(i,j)| \leq \delta 2\}$

A step of confirming that the total sum of a difference (i.e. a difference in amount of light) between the total difference between each element of $I_M$ of measurement image data $I_M(I,j)$ within the target n×n pixels and each element of $I_T$, on the one hand, and template data $I_T(i,j)$, on the other hand, is within a set range ($\delta 2$).

(4) verify $(\{\Sigma|(d/dx)I_M(i,j)-(d/dx)I_T(i,j)| \leq \delta 3\}$ verify $\{\Sigma|(d/dy)I_M(i,j)-(d/dy)I_T(i,j)| \leq \delta 4\}$ A step of confirming that a difference (i.e. a difference in inclination at each point) between x-directional (i-direction) and y-directional (j-direction) differential values at measurement image data $I_M(i,j)$ point within target n×n pixels, on the one hand, and a differential value of template data $I_T(i,j)$, on the other hand, is within set ranges ($\delta 3$, $\delta 4$).

An algorithm matching with each apparatus is set on the basis of the combination of AND values or OR values given by formulae (2) to (4), and the degree of coincidence between the template and image data is found. It is desirable that the set values of $\delta 1$ to $\delta 4$, which are used as standards for determining the degree of coincidence, can be varied properly from the control computer, depending on an individual apparatus, to a value permitting determination of a target small defect.

Algorithms given by formulae (1) to (4) are only examples which are effective to detect, in particular, a defective portion called "isolated defect." The algorithms may be altered without departing from the subject matter of the invention. It is also possible to add optimal algorithms associated with an edge portion or a corner portion.

Figure 6:
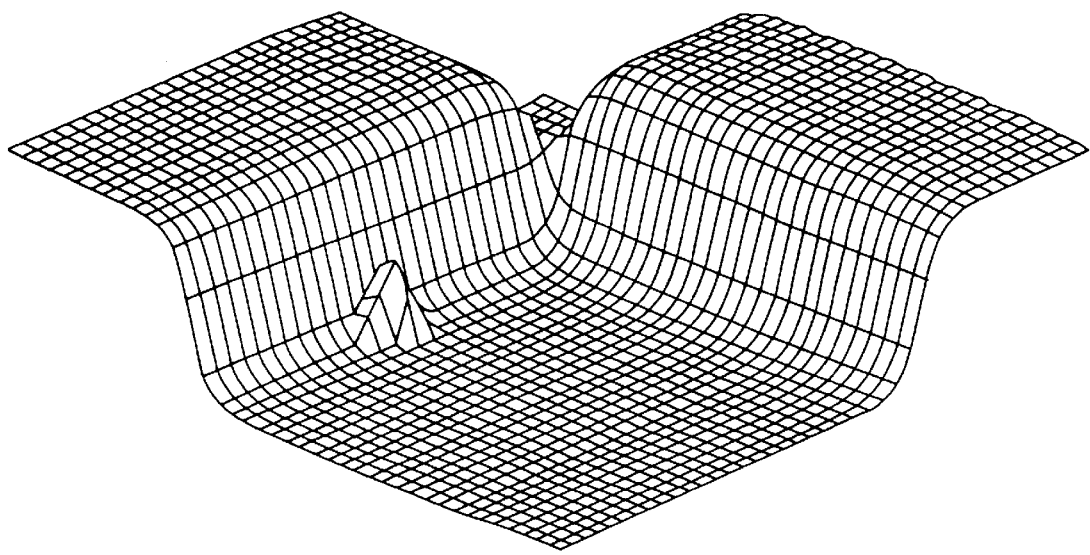
FIG. 6 shows an example of a very small defect present near a large figure.

For example, if a defective portion called "isolated defect" near a large pattern is measured, image data with an inclined defective portion may be obtained, as shown in FIG. 6. However, the data installed in the template memory 31 is, in general, not the data with an inclined defective portion as shown in FIG. 6. Thus, the algorithm (4) is altered to (4)' if $[\{(d/dx)I_M(i,j) \leq \delta 5\}$ and $\{(d/dy)I_M(i,j) \leq \delta 6\}]$ then $I_M(i,j) \leftarrow I_T(i,j)$ Thereby, a defective portion near a large pattern can be measured.

In the simplest process to be performed when the degree of coincidence has been calculated and the presence of a defect determined, a flag D indicating the presence of the defective portion is set and the information to this effect is directly delivered to the comparison circuit 11 in the following stage of the signal processing circuit 30-1 or the control computer 10. Although this process appears to be advantageous at a glance, the presence of the defect, type of the defect, the position of the defect are also detected in the following-stage comparison circuit 11 by proper comparison algorithms. There is no need to provide the signal processing circuit 30-1 with the same functions.

Figure 5:
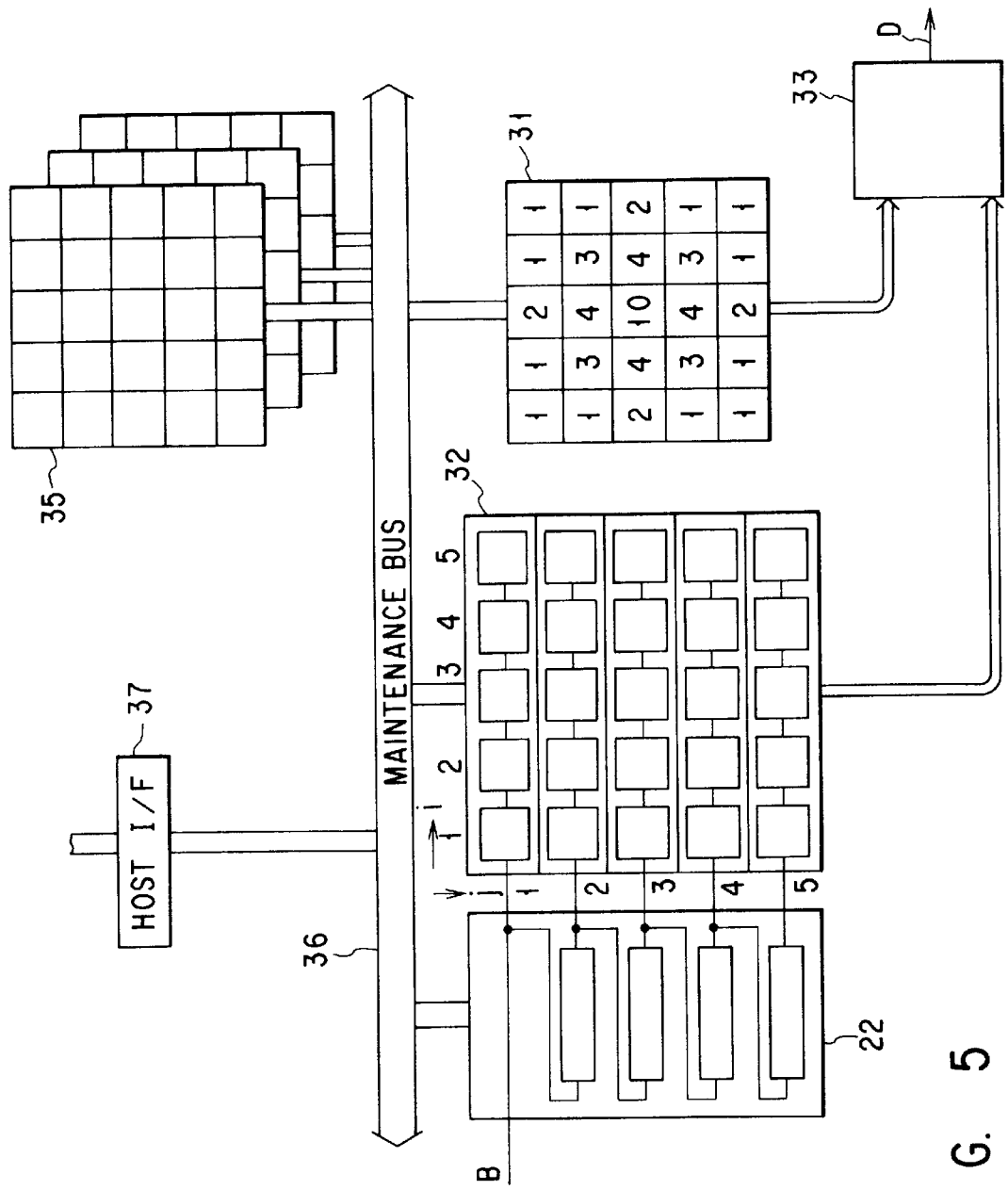
FIG. 5 is a view for describing means for accessing each circuit from a host computer.

In the second simplest process, when the presence of a defect has been detected at a predetermined value or more of the degree of coincidence, a center portion of image data shown in FIG. 5, i.e. data of i=3 and j=3 in the figure, is rewritten. That is, the signal level is controlled with the noise level maintained.

As is shown in FIG. 5, for example, if the numerical value of a center value is 10 and the presence of a defect is detected by the algorithm in the following-stage comparative circuit, the numerical values of i=3 and j=3 are increased properly (to, e.g. 15) so that the presence of the defect can be detected by the algorithm in the comparison circuit 11. Thereby, the small defect can be detected.

In the case where a plurality of template memories 31 are prepared, a signal level amplification value may be set for each template. Since the signal level amplification value varies depending on the S/N of the inspection apparatus and the algorithm of the comparison circuit 11, it is desirable that a proper value can be set from the control computer 10.

As has been described above, according to the present embodiment, the measured image data is subjected to the operation of the template 31 of about 5×5 pixels and the degree of coincidence between the measured image data and prepared template data is found. Thus, the presence of a defect is detected, or the signal corresponding to the defective portion is increased or decreased to enhance the apparent S/N and then delivered to the following-stage comparison circuit 11. Accordingly, only the signal of the defective portion can be processed without varying the noise level and converted to measured image data with a high S/N, or an unnecessary noise component is reduced and the signal of the defective portion can be converted to measured image data with a relatively high S/N. Thus, a very small defect can be measured, unlike the prior art.

Since the template 31 is set individually for each defect, it is possible to eliminate a difference in maximum defect detection dimensions due to a difference in signal amplitude of white-type defects and black-type defects. Specifically, since only the signal of a small defect which is of the type difficult to detect can be intensified, the maximum defect detection sensitivity of the inspection-apparatus can be set to be constant irrespective of the type of defect. Moreover, since the defect detection sensitivity can be enhanced by the signal processing method, there is no need to increase the NA of the observation optical system excessively (e.g. 0.85 or more). Thus, no problem arises with respect the fabrication of a lens. In addition, there is no decrease in focal depth due to a higher NA, or no problem due to shorter wavelength. Therefore, remarkable practical advantages can be brought about.

(Embodiment 2)

It is obvious that the above-described signal processing circuit 30-1 will function more effectively if it is combined with conventional Finite Impulse Response (FIR) filter means. The technique for applying the FIR filter means to this type of inspection apparatus is generally known, as described in detail, for example, in Jap. Pat. Appln. KOKAI No. 61-82107 disclosing the invention titled "Optical Defect Inspection Apparatus."

The conventional FIR filter means, however, is used as image improving means for correcting degradation of image data due to various factors, that is, for restoring the degraded image data to the original image data.

Figure 7A:
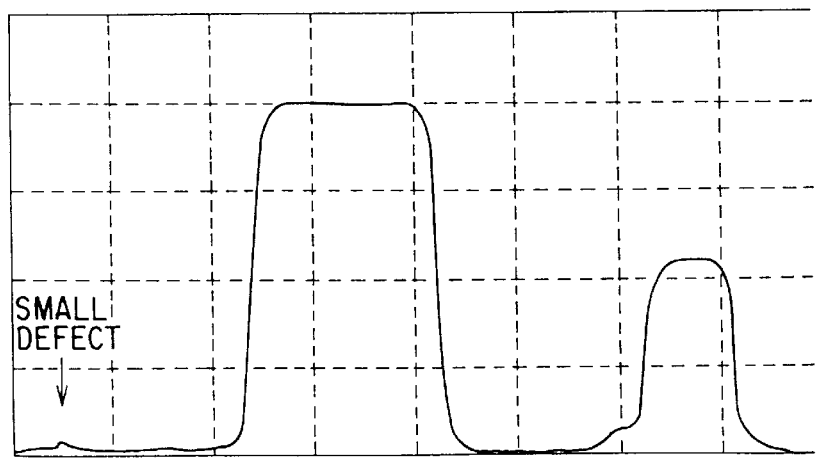
FIGS. 7A and 7B show examples of observation data obtained before and after the data is multiplied by a coefficient for emphasizing an image.

This image improving means functions relatively effectively in the case of a die-to-die inspection apparatus disclosed in Jap. Pat. Appln. KOKAI No. 61-82107, but it does not function effectively in the case of a data base inspection apparatus. The reason is that when the FIR filter is used as image improving means, a signal of a high frequency band is increased, a noise component is thus emphasized and a signal as shown in FIG. 7A is changed to a signal as shown in FIG. 7B containing an overshoot at an edge portion.

Figure 7B:
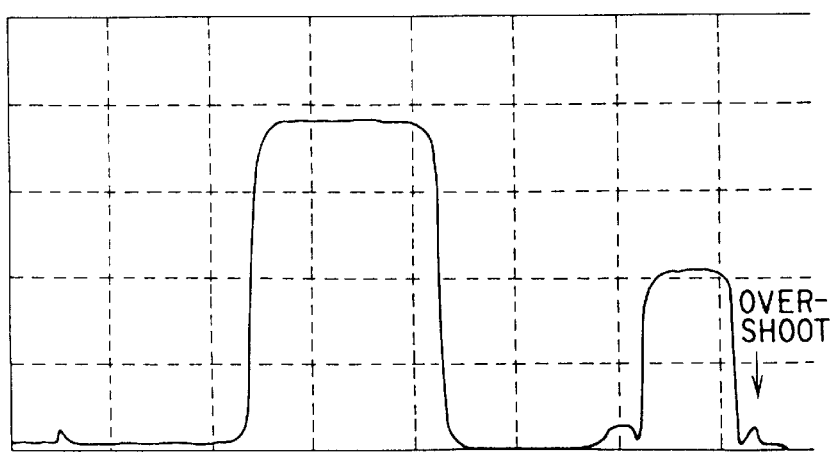

In the die-to-die inspection apparatus, even if the overshoot occurs as shown in FIG. 7B, no serious problem arises since the same adjacent patterns are compared. It is desirable that the signal amplitude of the small defect is increased. However, in the data base inspection apparatus, the design data and measured data are compared. Thus, even if the signal of a small defect is increased, as in FIG. 7B, an overshoot occurs at the edge portion. As a result, a difference between the measured data and design data increases and a pseudo-defect occurs. Consequently, the image improving means using the FIR filter does not function effectively.

In the present embodiment, as shown in FIG. 8, the FIR filter is used not as image improving means but as noise averaging means. In FIG. 8, the same parts as shown in FIG. 3 are denoted by like reference numerals.

An output A of the photodiode array 7 is A/D converted to digital data by the A/D converter 21. The digital data is rearranged as two-dimensional image data by a second line buffer 41 and then subjected to the operation of an FIR filter 42. A noise component is averaged by the FIR filter 42 and then subjected to the signal processing in the above-described line buffer 22 and signal processing circuit 30-1.

As is shown in FIG. 9, the FIR filter 42 subjects input image data 44 and a filter coefficient 45, e.g. as shown in FIG. 10, to multiplication and accumulation, and generates a corrected output pixel 46. The filter coefficient 45 shown in FIG. 10 is an example of a 5×5 matrix for averaging the noise component. It is desirable that the coefficient can be rewritten from the control computer 10 so as to match with each apparatus.

It should suffice if the matrix for multiplication and accumulation of the FIR filter 42 is constituted by 5×5 pixels to 10×10 pixels. The constitution of the matrix may be properly chosen in accordance with the magnification of the optical system and beam spot expansion coefficient.

To average the noise component by the filter means to decrease the small signal. According to the inventors' simulation, however, a corrected output 46 processed with a proper filter coefficient can provide image data from which noise has been removed effectively. Although the output of a small defect is reduced slightly, the S/N is improved in the image data.

Since the image data output from the FIR filter 42 is passed through the signal processing circuit 30-1, the calculation of the degree of coincidence becomes more exact and the small defect detection ratio is more enhanced than in the prior art.

(Embodiment 3)

In a third embodiment of the present invention, as shown in FIG. 11, the order of arrangement of the FIR filter 42 and the signal processing circuit 30-1 can be reversed, as compared to the method shown in FIG. 8. Specifically, the output A of the photodiode 7 is converted to digital data by the A/D converter 21. The digital data is supplied to the first line buffer 22 and signal processing circuit 30-1 and then to the second line buffer 41 and FIR filter circuit 42.

In this case, too, the FIR filter 42 is used not as image improving means but as noise averaging means. In the above-described signal processing circuit 30-1, the signal of the portion corresponding to the template data is emphasized. Thereafter, the emphasized image data is subjected to the operation of the FIR filter 42. The FIR filter 42 averages the noise component and reduces the signal of the small defect. The signal of the small defect has already been fully emphasized in the signal processing circuit 30-1 in anticipation of the decrease in the FIR filter 42. As a result, image data with a very high S/N can be sent to the following-stage comparison circuit 11. Thus, even if the same algorithm as in the prior art is used in the comparison circuit 11, the present defect inspection apparatus can have a fully high detection sensitivity.

The second and third embodiments may be constructed to adopt either method. That is, the order of arrangement of the processing circuit 30-1 for emphasizing the defective portion and the FIR filter 42 may be reversed.

In the second and third embodiments, the line buffer 22 for the signal processing circuit and the line buffer 41 for the FIR filter are provided independently. However, these buffers may be integrated, as in a fourth embodiment of the invention as shown in FIG. 12. In the fourth embodiment, outputs of the FIR filters 42 are supplied respectively to two-dimensional matrices necessary for determination in the signal processing circuit 30-1.

As already described with reference to FIGS. 8 and 11, this structure can be applied to the structure wherein a plurality of signal processing circuits 30-1 are provided to function in parallel in front of the FIR filter 42.

The present invention is limited to the above embodiments. In the embodiments, the digital data signal is increased to emphasize the defective portion when the degree of coincidence between the template data and measured image data has exceeded a predetermined value. However, the digital data signal may be decreased in some cases. For example, a digital data signal corresponding to a pseudo-defect may be decreased when the degree of coincidence between the template data and the portion detected as the pseudo-defect has exceeded a predetermined value.

Besides, the algorithms for calculating the degree of coincidence with the template data over the entire two-dimensional digital data in the operation processing are not limited to algorithms (1) to (4) and can be altered according to specifications. In the determination means, two-dimensional digital data is compared with separately prepared design data. The design data, however, may be replaced with measurement data which is obtained by observing the same adjacent pattern by means of the same optical system and corresponds to a pattern image observed by the same optical system received by the same light receiving element.

(Embodiment 5)

Figure 13:
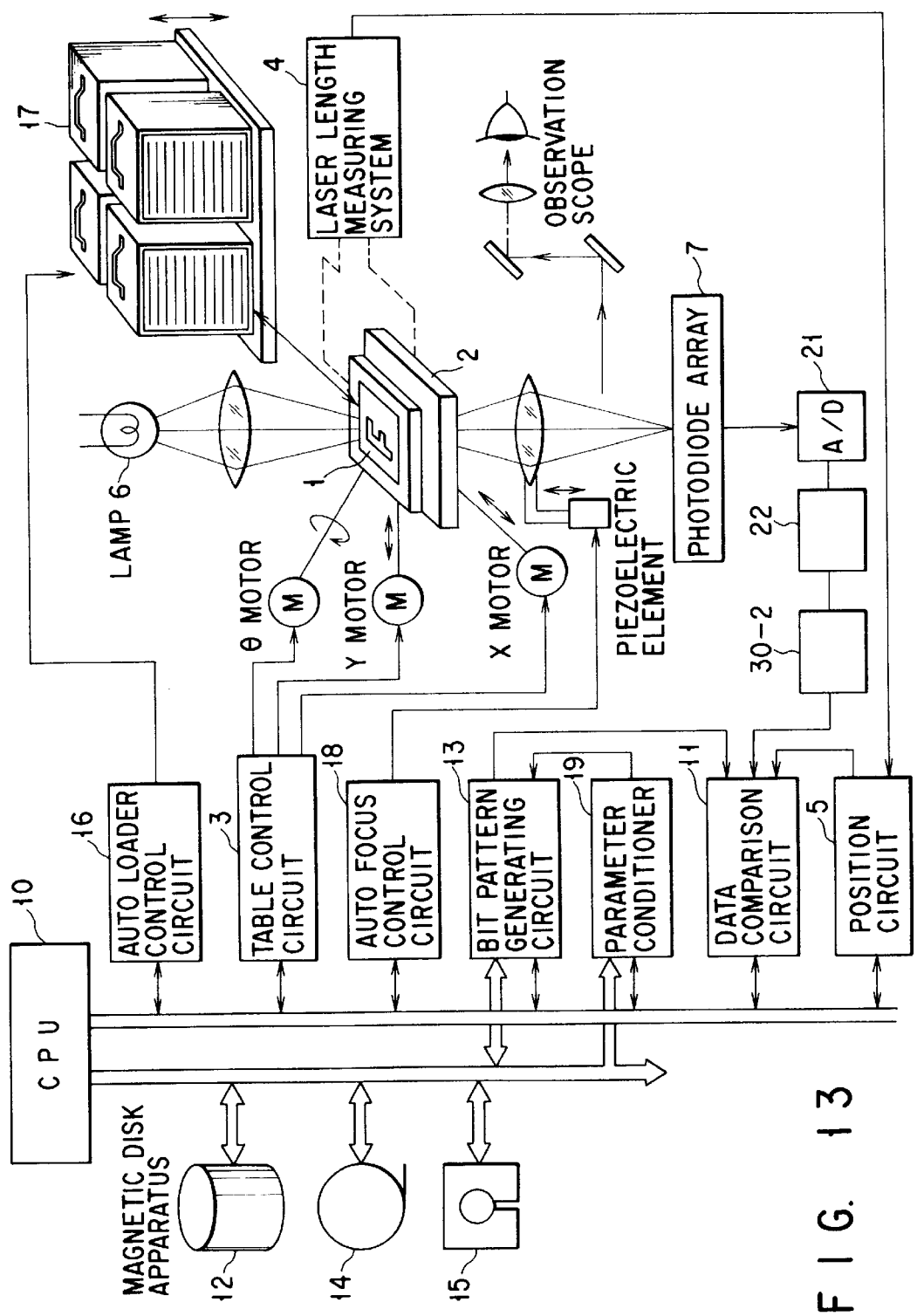
FIG. 13 schematically shows the structure of a pattern inspection apparatus according to a fifth embodiment of the invention.
Figure 14:
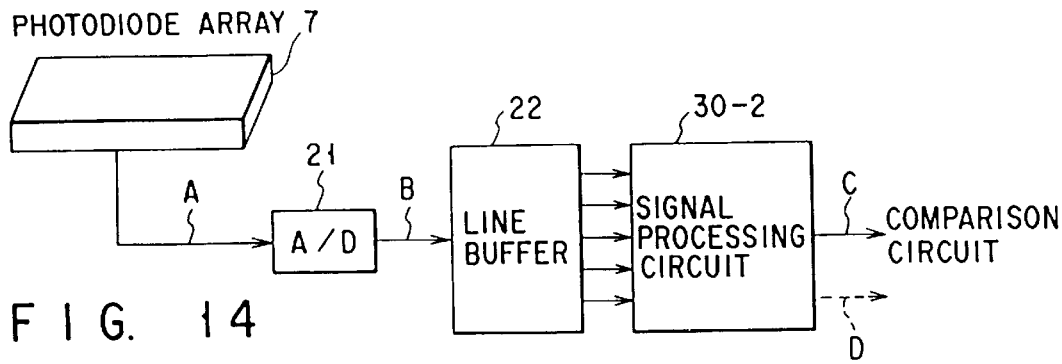
FIG. 14 is a conceptual view illustrating a step of processing a sensor signal in the fifth embodiment.

As is shown in FIGS. 13 and 14, the defect inspection apparatus of this embodiment is characterized in that an output A from the photodiode array 7 is converted to a digital signal B by the A/D converter 21 and the digital signal B is subjected to signal processing in the buffer circuit 22 and signal processing circuit 30-2 (described later in detail).

A main part of this embodiment will now be described. As is shown in FIG. 15, the signal processing circuit 30-2 comprises an observation data pixel buffer 52 (hereinafter referred to as "pixel buffer") and an algorithm operation circuit 53.

The lines of the line buffer 22 which stores the A/D converted observation signals B successively are FIFO (First in First out) memories of plural stages corresponding to the number of pixels of the photodiode array 7. The number of storage lines is determined by an image window size for observation and evaluation (in the embodiment shown in FIG. 15, the number of lines is 5 since the matrix consists of 5×5 pixels) and the lines are connected to one another in a chain-like manner.

Figure 15:
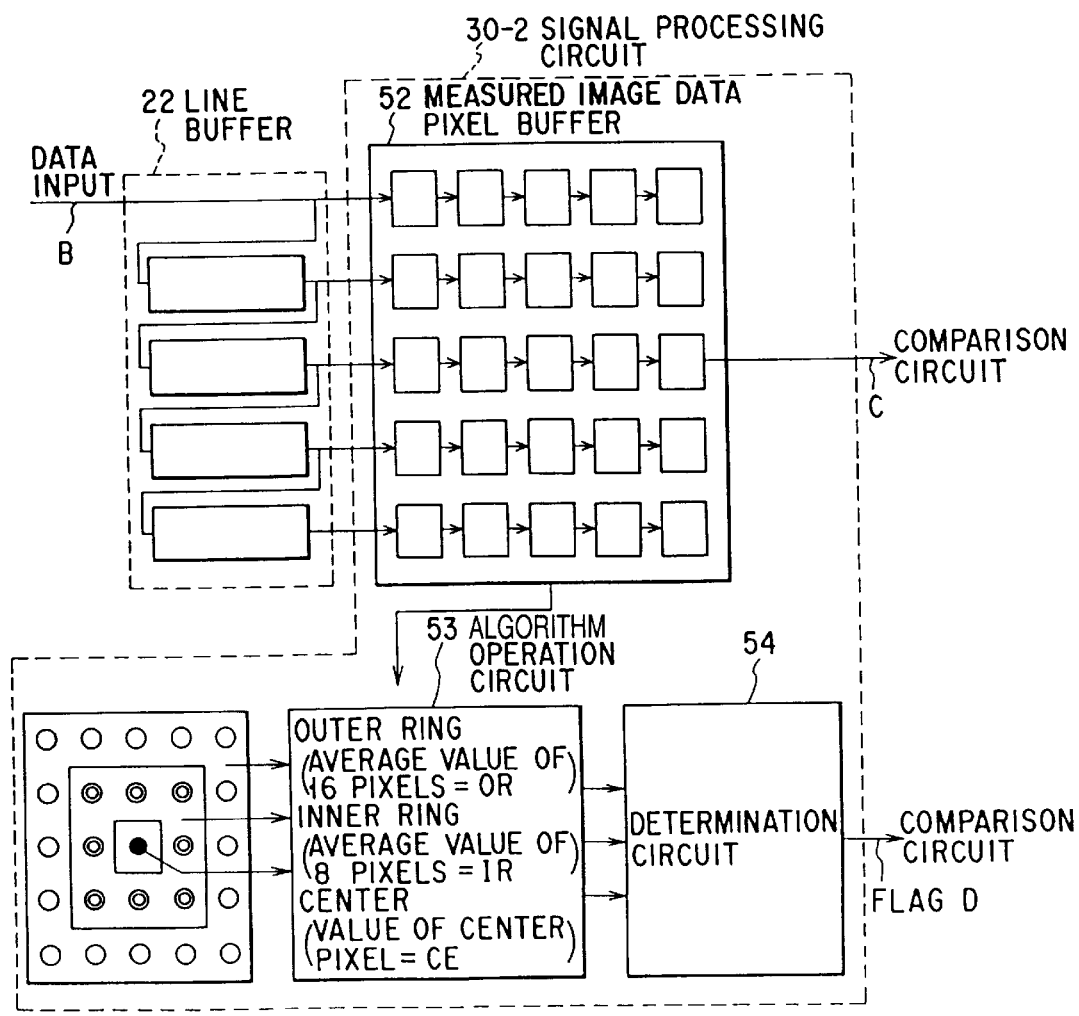
FIG. 15 is a conceptual view illustrating a concept of signal processing in the fifth embodiment.

The pixel buffer 52 comprises an n-number of first-order buffers formed by connecting in series an n-number of stages of registers corresponding to the image window size for observation and evaluation (in the embodiment shown in FIG. 15, n=5 since the matrix consists of 5×5 pixels). Image data is delayed in the line buffer 22 on a line-by-line basis and the delayed image data synchronized on a line-by-line basis is input in parallel to the pixel buffer 52.

The algorithm operation circuit 53 and a determination circuit 54 constitute a basic part of this embodiment. The circuits 53 and 54 determine whether the same feature as that of a small defect is found in two-dimensional data of n pixels×n pixels extracted by the pixel buffer 52.

The algorithm operation circuit 53 performs arithmetic operations of the value of each register in the pixel buffer 52. The circuit 53 comprises a determination circuit for determining whether a defect is present in pixel data within the pixel buffer by comparing an arithmetic operation result with an associated set value.

For example, when the pixel buffer comprises 5×5=25 pixels, as shown in FIG. 15, the values CE, IR, OR, SA and SB are defined as follows: CE=the value of a center pixel; IR=an average value of 8 pixels surrounding the center pixel; OR=an average value of 16 pixels surrounding the 8 pixels; SA=CE−IR; and SB=IR−OR.

When values SA and SB are positive, the observation data is determined to represent a convex shape and the values SA and SB represent the height of the convex.

Similarly, when values SA and SB are negative, the observation data is determined to represent a concave shape and the values SA and SB represent the depth of the concave.

Figure 17:
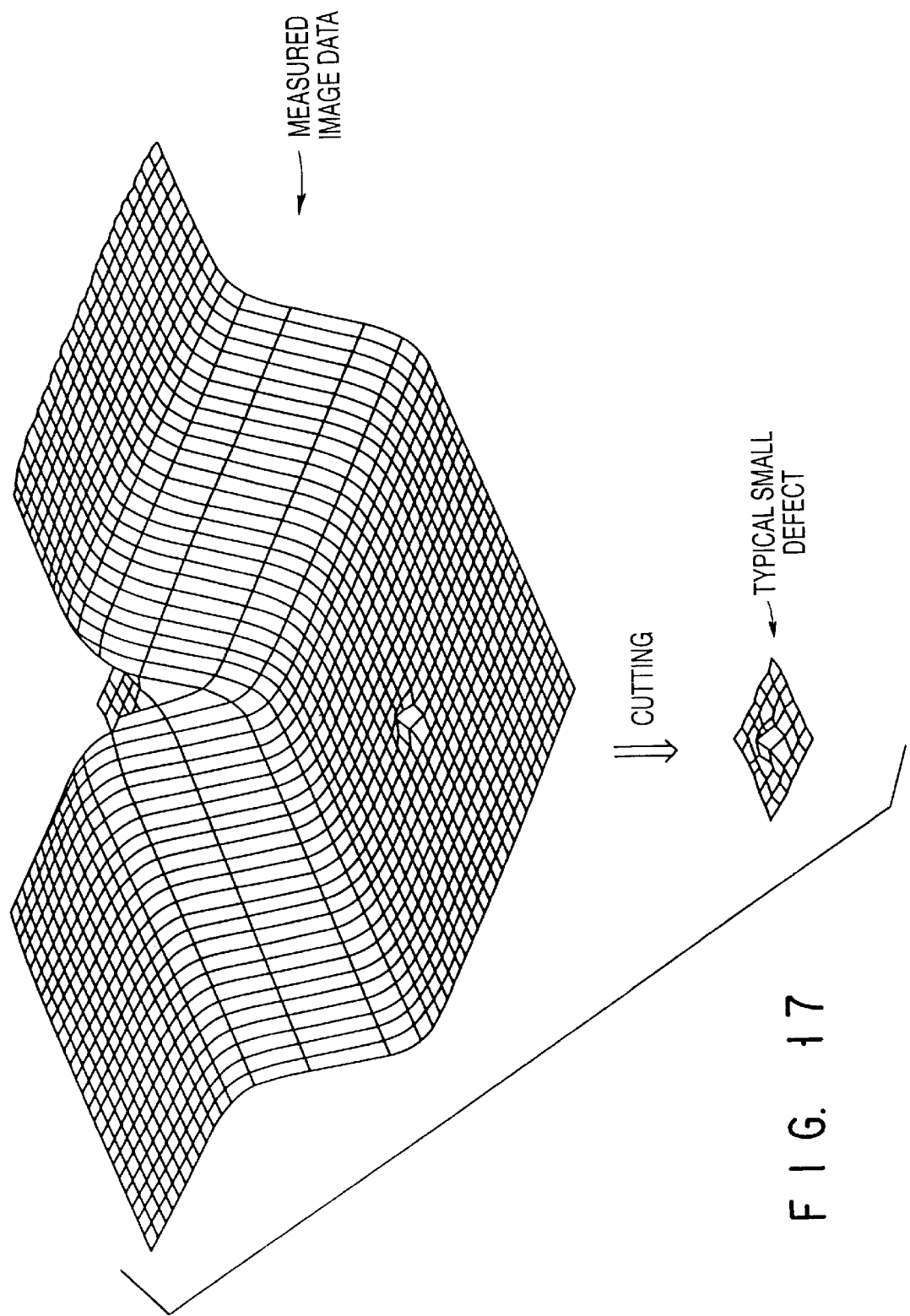
FIG. 17 shows an example of a defect to be detected.

Small defects in the pattern have various shapes In general, the size of the defect is 3×3 pixels to 5×5 pixels and the shape is convex or concave (see FIG. 17).

In the defect determination circuit, if the values SA and SB obtained from an actual small defect are below the lower limits, the present of the defect is determined, and a defect flag D is set. The information to this effect is sent to the comparison circuit or control computer 10 in the following stage of the signal processing circuit.

The shapes of defects which can be detected are not limited to the above-mentioned simple concave and convex ones. For example, when the value SA is negative and the value SB is positive, an M-cross sectional shape can be detected. When the value SA is positive and the value SB is negative, a W-cross sectional shape can be detected. The height and depth of the M shape and W shape are represented by the magnitudes of SA and SB. Thus, a defect of a peculiar shape can be determined.

Figure 16:
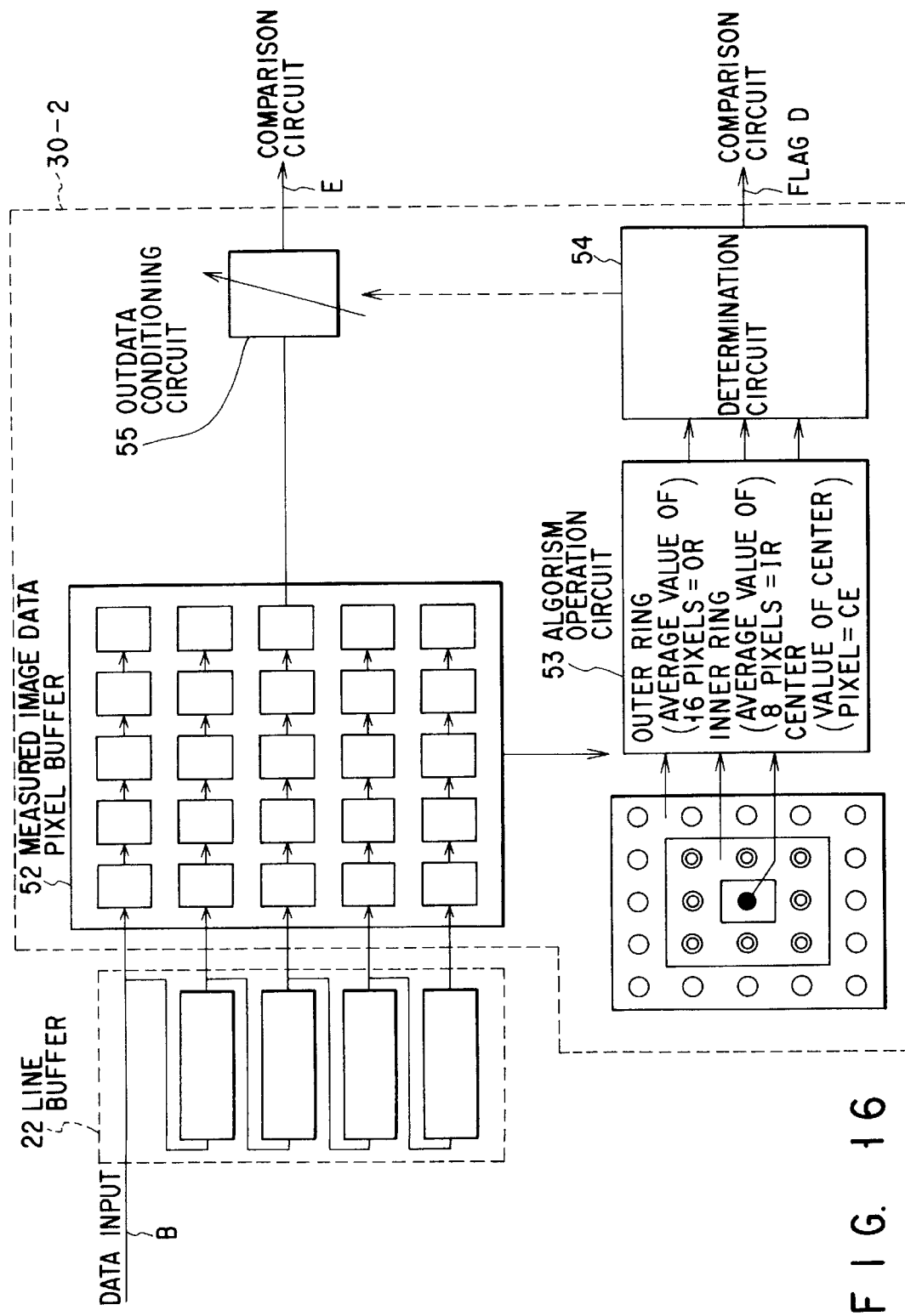
FIG. 16 is a conceptual view illustrating a concept of signal processing in a sixth embodiment.

A sixth embodiment of the invention will now be described with reference to FIG. 16.

If a defect has been detected by the determination circuit 54, the center data of the pixel buffer shown in FIG. 15 may be rewritten by an output conditioning circuit 55.

The output data conditioning circuit 55 corrects a signal of a defective portion of image data. The correction may be effected by a method of increasing or decreasing the signal, e.g. multiplying the real signal value by 1.5 or 2 or reducing the real signal value to ½ or ⅓, or by a method of setting the signal amplitude to a predetermined value, e.g. 90% or 5% of the normal signal amplitude.

By the correction of the signal, the apparent S/N of the signal can be enhanced. The data E corrected by the output data conditioning circuit is sent to the following-stage comparison circuit 11.

The signal of the defect is amplified and the noise component is attenuated by the rewriting of the defective portion of image data in the output data conditioning circuit 55. Thus, a small defect which cannot be detected in the conventional comparison circuit can be detected by the following-stage comparison circuit by the same algorithm as in the prior art.

Figure 18:
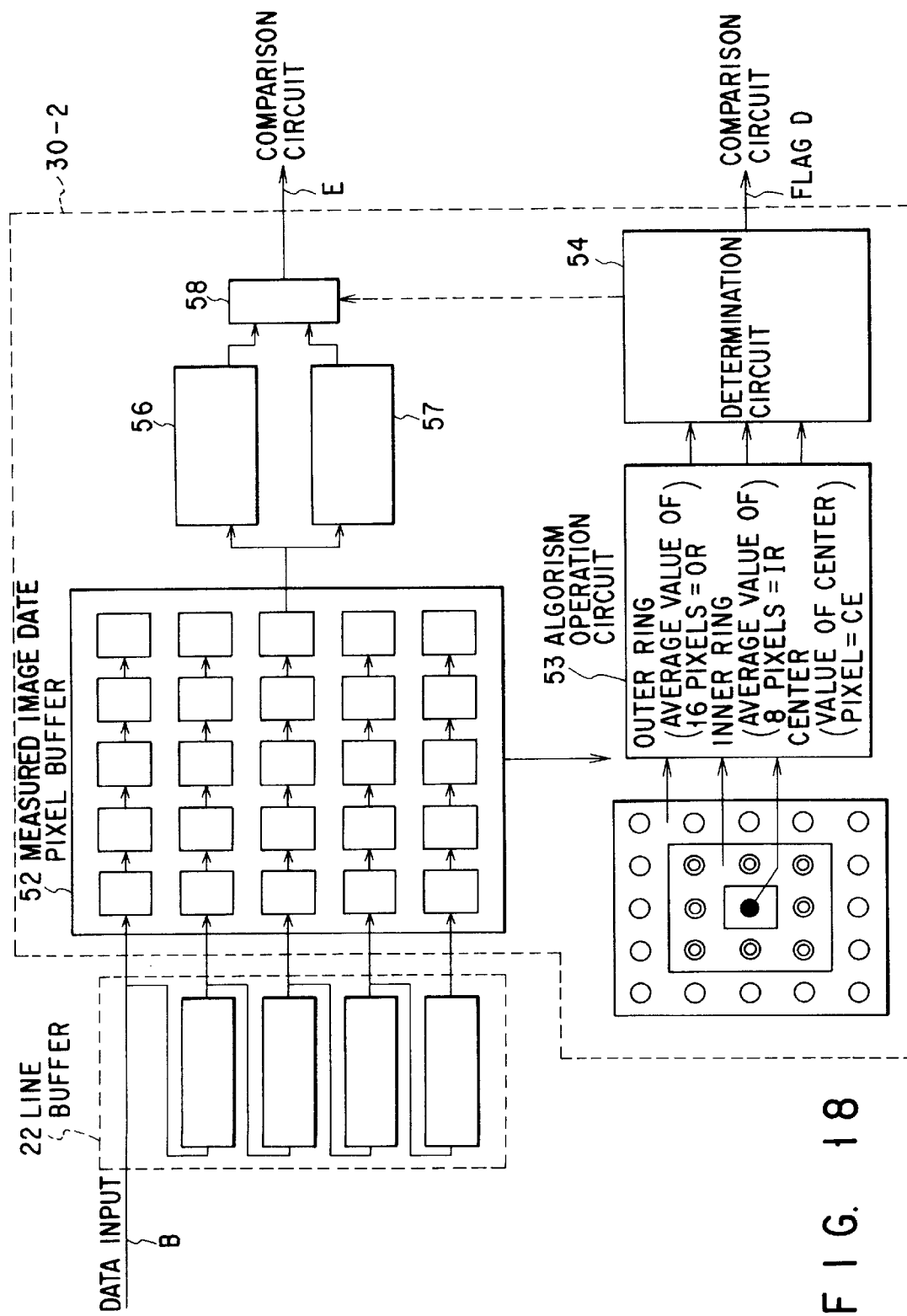
FIG. 18 is a conceptual view illustrating a concept of signal processing in a seventh embodiment.

A seventh embodiment of the invention will now be described with reference to FIG. 18. In the above-described output data conditioning circuit of the sixth embodiment, only the signal of the detected defective portion is amplified or attenuated. However, the defective portion can be emphasized similarly by a two-dimensional digital filter, as will be described below.

Specifically, two two-dimensional digital filters are prepared. The first filter 56 is provided with slight smoothing/noise low-band characteristics (low-pass spatial frequency characteristics) or a flat coefficient (flat spatial frequency characteristics). The second filter 57 is provided with a coefficient for emphasizing a small defect (high-pass spatial frequency characteristics or band-pass coefficient having a peak at target defect dimensions). As is shown in FIG. 18, signals are input to the first and second filters in parallel at the same time, and an output from one of the first and second filters is selected by a switch 58. The selected output is delivered as an output from the output data conditioning circuit.

In the above structure, the switch for selecting the outputs of the first and second filters is operated by a determination signal of the above-described determination circuit 54. Specifically, the output of the first filter is normally selected and the selected output is delivered to the following-stage comparison circuit 11 with slight noise reduction or without data processing. If the determination signal of the determination circuit 54 indicates the presence of the defect, the output of the second filter is selected only while the image of the defect is being output, and data F in which the defective portion is emphasized is output to the rear-stage comparison circuit 11.

In this case, it is desirable in terms of filter characteristics to adopt a FIR type digital filter. However, an IIR type filter may be used. The number of tap stages of the filter is practically about 5×5 to 7×7. However, the number of tap stages may be different in mutually perpendicular sides (vertical and horizontal sides), e.g. m×n.

(Embodiment 8)

An eighth embodiment of the present invention will now be described with reference to FIG. 19. In the eighth embodiment, a half-tone mask (not a chrome/half-tone combinatorial mask) is processed.

Figure 19:
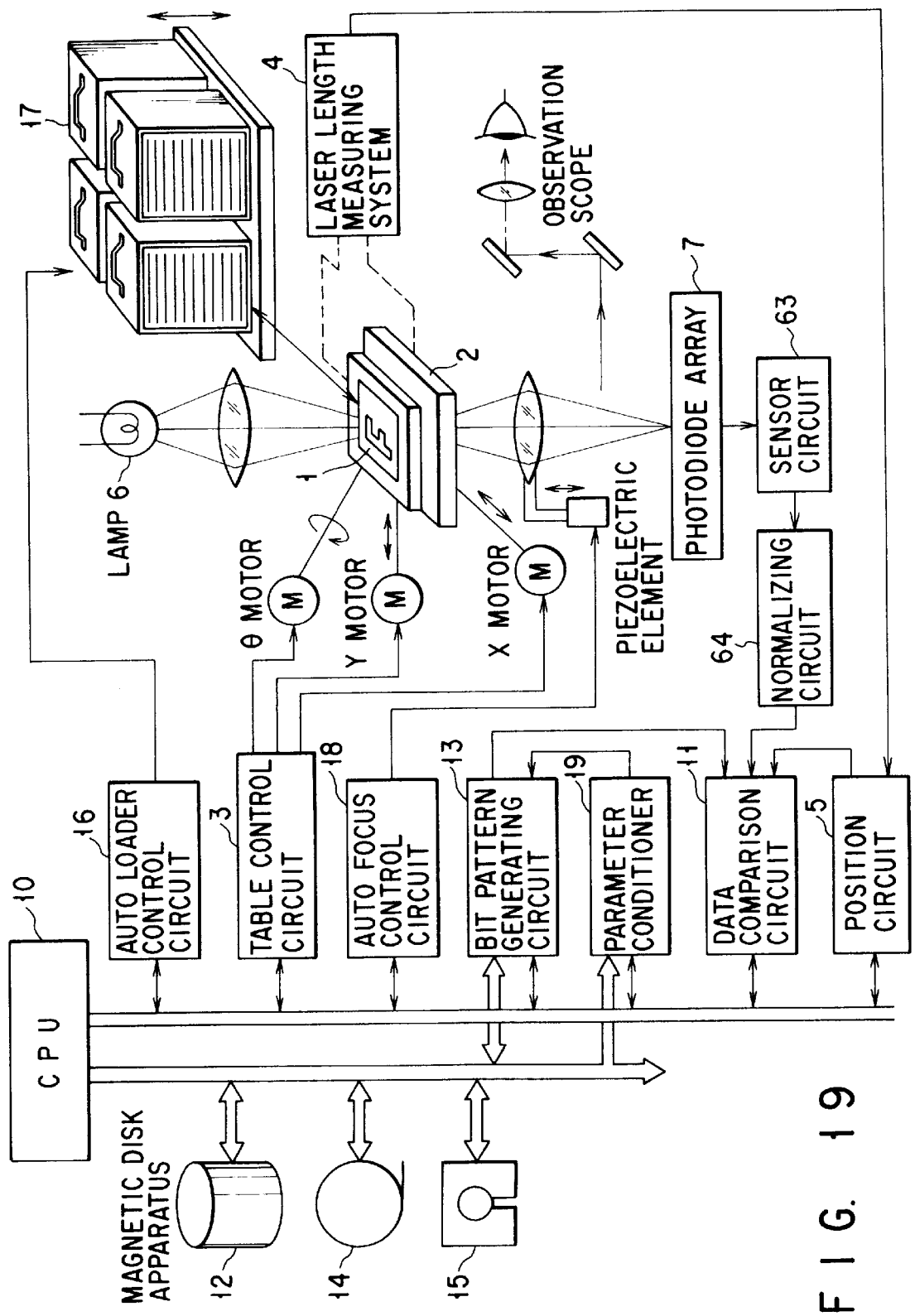
FIG. 19 schematically shows the entire structure of a pattern inspection apparatus according to an eighth embodiment.
Figure 20:
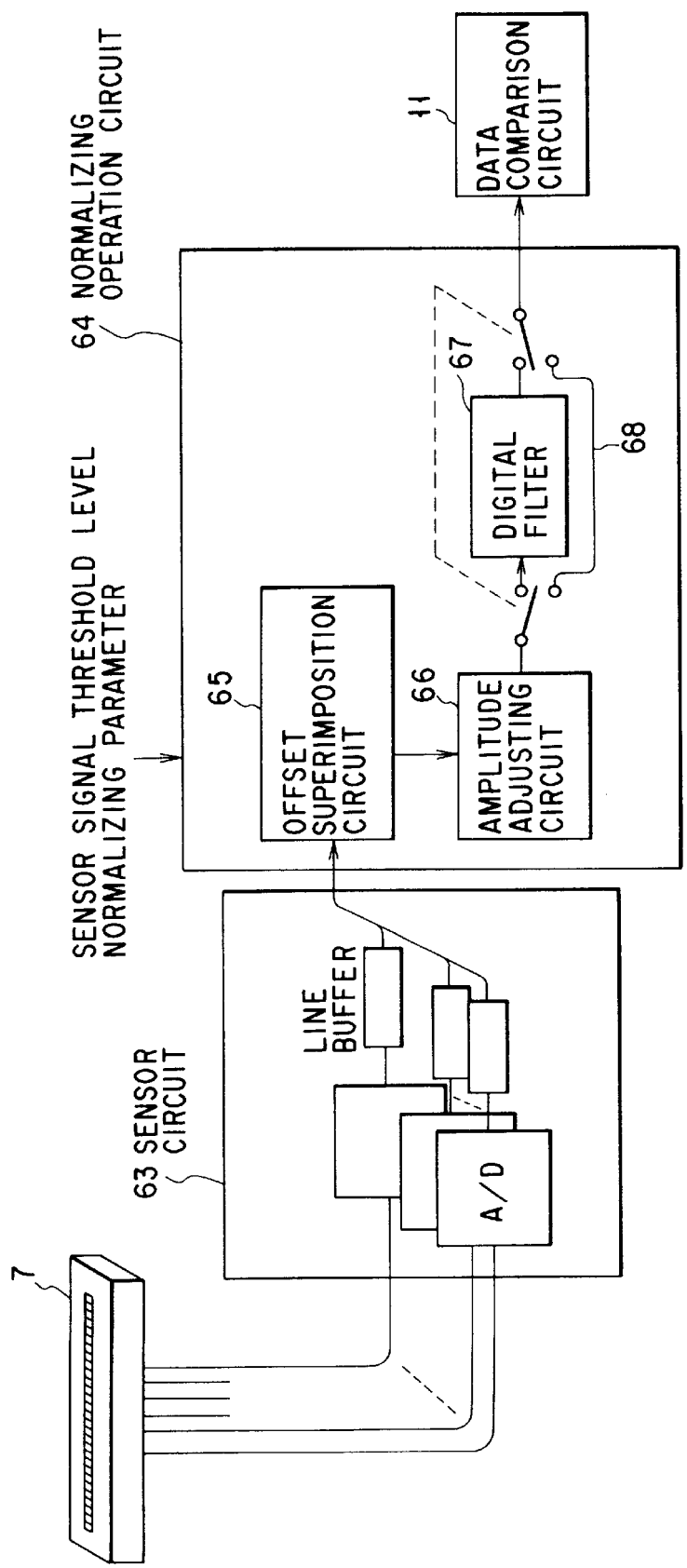
FIG. 20 is a conceptual view illustrating a step of processing a sensor signal.

The defect inspection apparatus of this embodiment is characterized in that a normalizing operation circuit 64 comprising an offset superimposition circuit 65, an amplitude adjusting circuit 66 and a digital filter 67 is provided between a sensor circuit 63 and the comparison circuit 11, as shown in FIGS. 19 and 20, thereby performing signal processing, as described below in detail.

Figure 21:
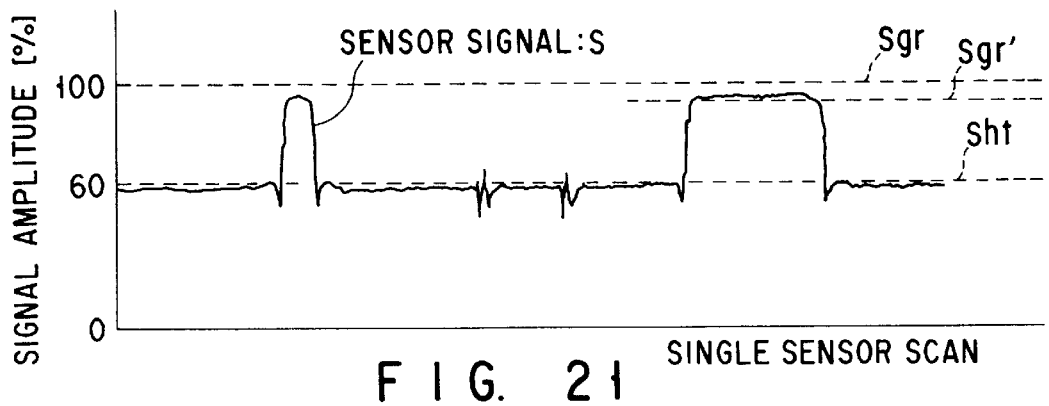
FIG. 21 shows an example of an observation signal of a half-tone mask.
Figure 26:
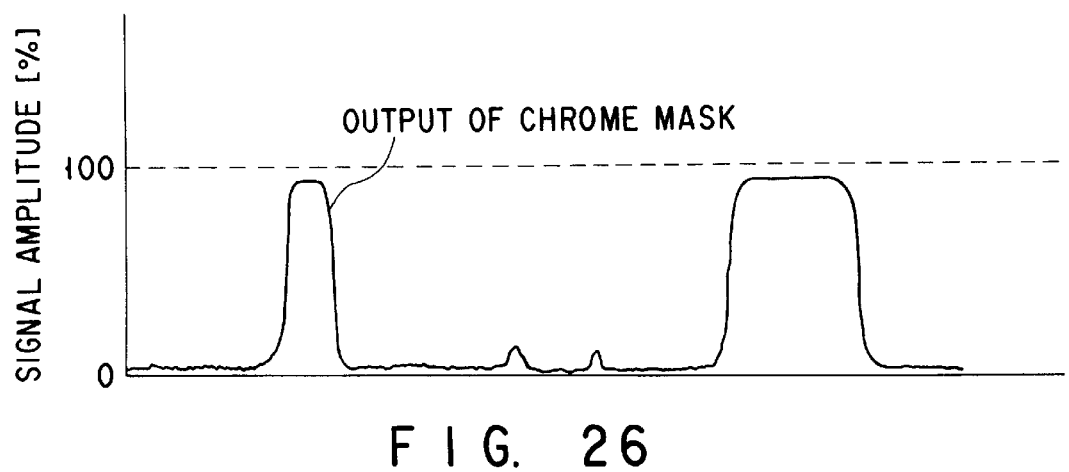
FIG. 26 shows an example of an observation signal of a conventional chrome mask.
Figure 41:
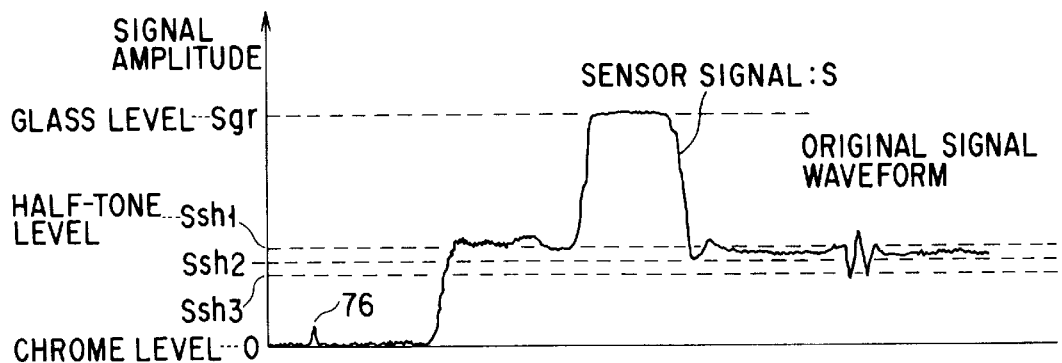
FIGS. 41 to 48 show examples of signals obtained in the step of processing in the case of using a combination of a chrome film and a half-tone film.

The sensor circuit 63 receives a signal from the photo-diode array 7 and outputs time-serial data as shown in FIG. 26 in the case of a chrome mask, as shown in FIG. 21 in the case of a half-tone mask (not a chrome/half-tone combinatorial mask), or as shown in FIG. 41 in the case of a chrome/half-tone combinatorial mask. The normalizing operation circuit 64 receives the time-serial data.

When a chrome mask is observed, this input signal has ideal amplitudes, as shown in FIG. 26. That is, the amplitude at a glass transparent portion is about 100% and that at a chrome shield portion is about 0%. On the other hand, in the case of a half-tone mask, as shown in FIG. 21, the light transmissivity of a half-tone shield film portion replacing the chrome is about 10% to 70%, and an overshoot and an undershoot occur at a pattern edge portion.

With respect to input signals to the normalizing operation circuit 64, a signal level of the glass transparent portion is set at a first threshold $S_{gr}$ and an average signal level of the half-tone portion is set at a second threshold $S_{ht}$.

Figure 22:
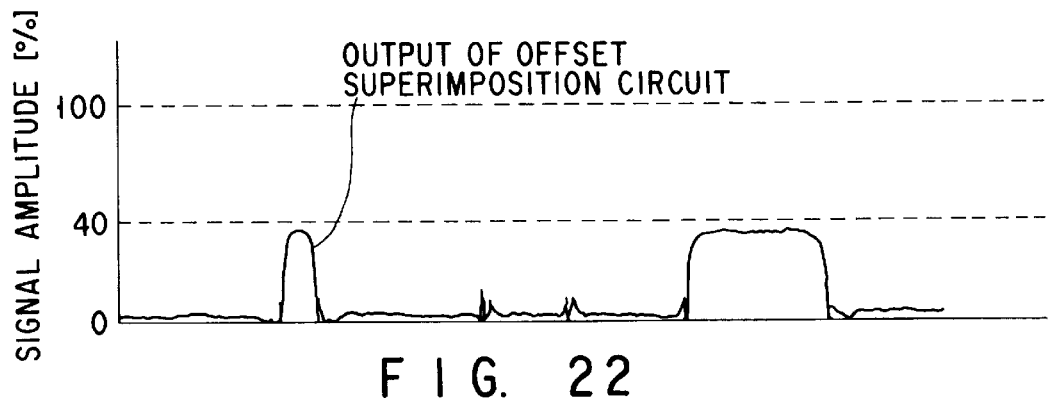
FIG. 22 shows an output signal obtained by subjecting the signal of FIG. 21 to the operation of an offset superimposition circuit.

The offset superimposition circuit 65 subtracts the second threshold $S_{ht}$ from the input signal. In this case, if the subtraction result is a negative value, the absolute value of data is adopted and can be inverted to a positive value at the same time. Specifically, if the subtraction result is a negative value, the subtraction result is multiplied with a weighting coefficient K ($-1 \leq K \leq 0$). If K=−1, the subtraction value is inverted. If K=0, no inverted portion occurs and the subtraction value is clamped. The weighting coefficient may be set at a value between −1 and ×0. If the weighting coefficient is K=−1 and the processing in the offset superimposition circuit 65 is performed, the waveform shown in FIG. 21 changes to a waveform as shown in FIG. 22.

Figure 23:
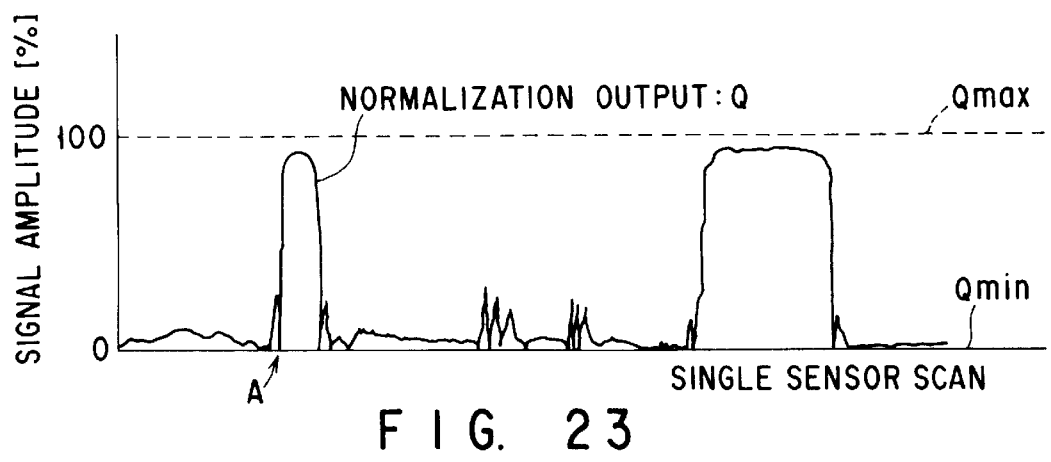
FIG. 23 shows an output signal obtained by subjecting the signal of FIG. 22 to the operation of an amplitude adjusting circuit.

The amplitude adjusting circuit 66 normalizes the signal amplitude between the first threshold $S_{gr}$ and the second threshold $S_{ht}$ in the range of amplitude between 0% and 100%. Specifically, an amplification gain is obtained to set a new maximum value $Q_{max}$ at 100% and the output of the offset superimposition circuit 15 is multiplied by the amplitude gain. As a result, the waveform shown in FIG. 22 changes to a waveform as shown in FIG. 23.

Figure 24:
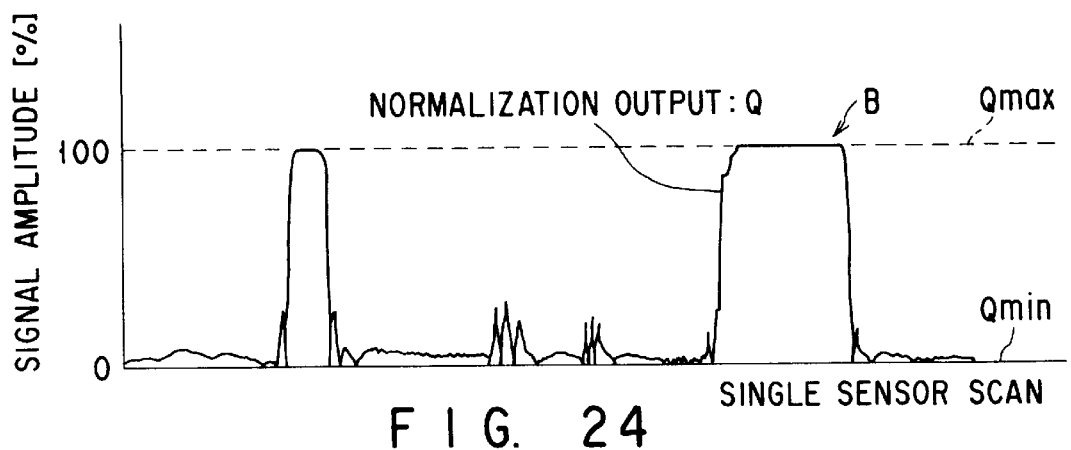
FIG. 24 shows an output signal obtained by subjecting the signal of FIG. 22 to the operation of a limiter.

In the amplitude adjusting circuit 66, an upper amplitude limiter is operated where necessary. If the amplified data exceeds 100%, the data is limited to 100%. For example, in the signal waveform shown in FIG. 21, the threshold $S_{gr}$ of the signal level of the glass is set at a slightly lower level $S_{gr}'$. In the amplitude adjusting circuit 66, $S_{gr}'$ is normalized to 100% and the upper amplitude limiter is operated. Then, a slight variation of the signal level of the glass can be flattened by the threshold. As a result, the waveform shown in FIG. 22 changes to a waveform as shown in FIG. 24.

The processing in the normalizing operation circuit 64 may be summarized, as shown below. FIG. 28 is a graph showing the input/output relationship in this processing.

$Q=Q_{max}$ (in the case where $S>S_{gr}$)

$Q=((S-S_{ht})\times(Q_{max}-Q_{min})/(S_{gr}-S_{ht})Q_{min}))+Q_{min}$ (in the case where $S_{gr} \geq S > S_{ht}$)

$Q=(K\times|(S-S_{ht})|\times(Q_{max}-Q_{min})/(S_{gr}-S_{ht})Q_{min}))+Q_{min}$ (in the case where $S<S_{ht}$)

In the above processing, the signal amplitude of the output (FIG. 23) of the amplitude adjusting circuit 66 is equivalent to that of the chrome mask in the range of 0% to 100%. However, in the pattern edge portion, (1) ringing occurs, (2) the signal of the pattern edge itself, which is cut by the upper amplitude limiter of S sh1, has a steep change point (point B in FIG. 24) which is different from a mild variation of the chrome mask shown in FIG. 26, and (3) an inverted portion of an undershoot fallen to 0% or below and an undershoot in the original waveform remain near 0%. If the signal with the waveform shown in FIG. 23 is input to the comparison circuit 11, an unnecessary signal component remains. Moreover, because of a steep change point, a pattern edge portion may be detected as a pseudo-defect.

Thus, the output of the amplitude adjusting circuit 66 is smoothed through the digital filter 67. That is, the waveform shown in FIG. 23 is changed to a waveform shown in FIG. 25.

Figure 25:
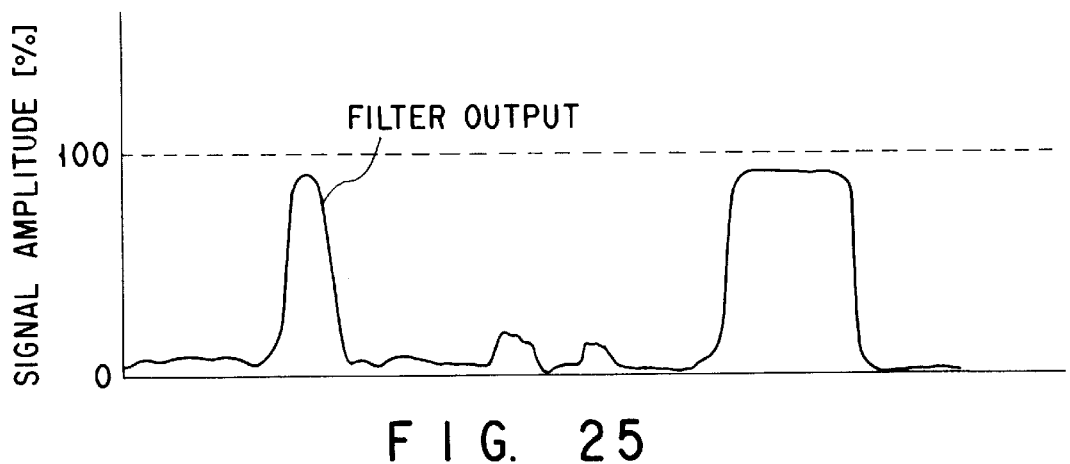
FIG. 25 shows an output signal obtained by subjecting the signal of FIG. 23 to the operation of a digital filter.

The characteristics of the waveform shown in FIG. 25, in particular, an edge portion thereof, are very close to those of a chrome mask as shown in FIG. 26. An exact inspection can be performed without possibility of erroneous detection. However, if a signal having characteristics similar to those of the signal of the chrome mask is output from the amplitude adjusting circuit 66, as shown in FIG. 23, there is no need to operate the digital filter circuit 67. Thus, a bypass 68 of the digital filter is provided.

Each threshold of the normalizing operation circuit 64 and the characteristics of the digital filter are set in consideration of the following matters.

In the processing in the offset superimposition circuit 65, an inherent positive-side signal amplitude and also an inverted portion of an undershoot waveform of peripheral pixels are added to a signal of a pinhole defect at the half-tone film portion. As a result, the defect is emphasized.

If the smoothing characteristics of the digital filter are high, the signal of the emphasized pinhole defective portion is attenuated. Thus, the signal of the pinhole defective portion is left intact and the characteristics for smoothing the signal of the edge portion are adopted (proper low-pass characteristics or band-pass characteristics).

In the above description, the flow of signals have been described in the order of the offset superimposition circuit 65, amplitude adjusting circuit 66 and digital filter circuit 67. However, the signals may be processed through the amplitude adjusting circuit 66, offset superimposition circuit 65 and digital filter circuit 67 in this order.

It is desirable that the order of processing and the normalizing parameters for thresholds in the offset superimposition circuit 65 can be set and written from an upper-level control computer or by means of a simple manual switch.

The signal levels referred to in the above description, such as a glass level or a half-tone level, may be given from the computer. It is practically advantageous, however, that the data on the signal levels is determined on the basis of observation values relating to specific portions such as a glass portion or halftone portion in the actual mask to be inspected.

(Embodiment 9)

In the above description, attention has been paid to an overshoot/undershoot phenomenon at a half-tone/glass edge portion. In the ninth embodiment of the invention, attention is paid to an overshoot/undershoot phenomenon at a half-tone signal level, which is more practical. In order to eliminate an overshoot and an undershoot, a non-sensitive band is provided in the processing by the offset superimposition circuit 69.

FIG. 29 shows input/output characteristics with a non-sensitive band, as compared to the input/output characteristics of the eighth embodiment as shown in FIG. 28.

Figure 27:
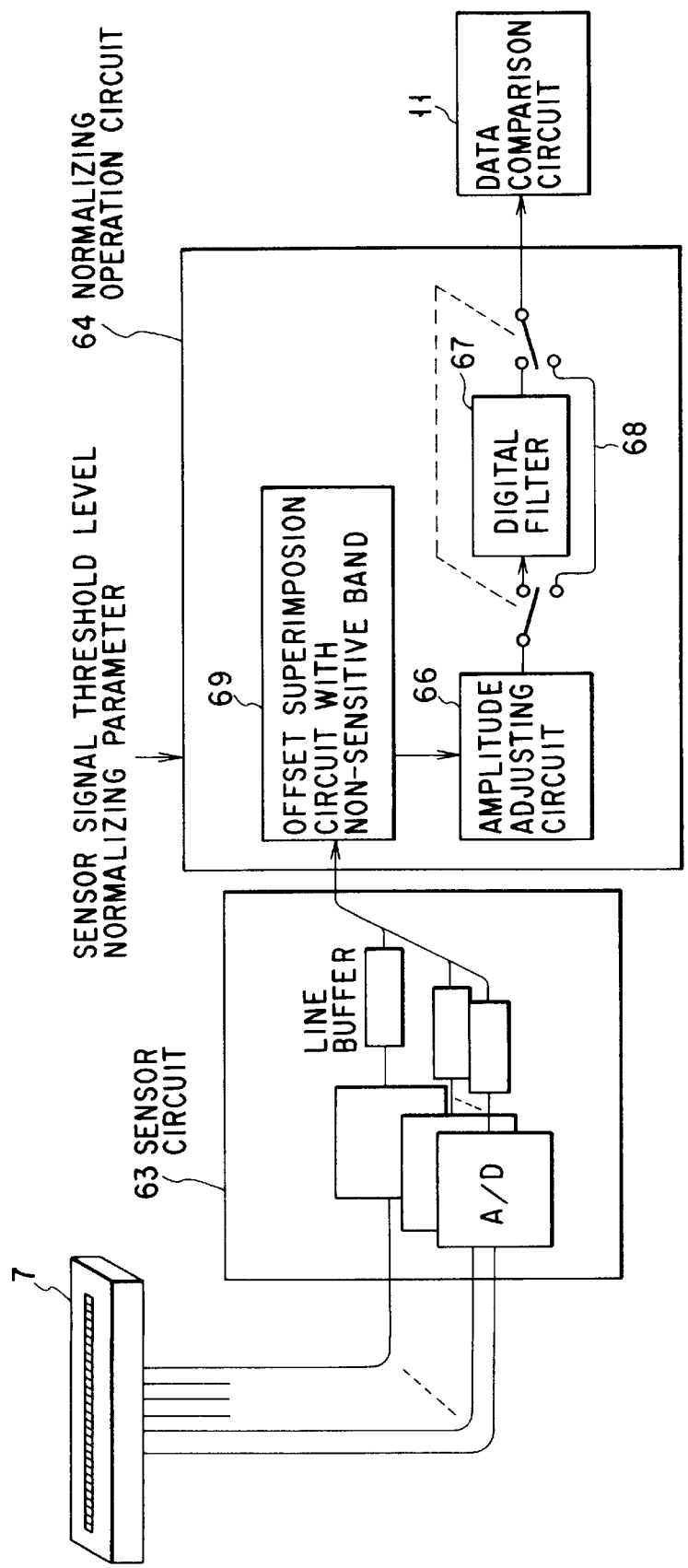
FIG. 27 shows a ninth embodiment using an offset superimposition with a non-sensitive band.
Figure 38:
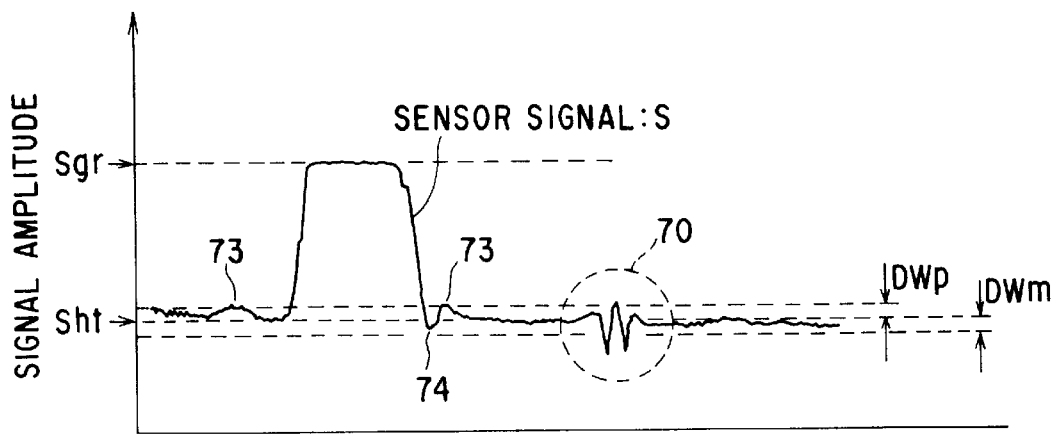
FIGS. 38 to 40 show examples of signals obtained in the step of processing in the offset superimposition circuit with non-sensitive band.

FIG. 27 is a block diagram showing the ninth embodiment. A signal as shown in FIG. 38 is output from the sensor circuit 63 and input to an offset superimposition circuit with a non-sensitive band. The input signal contains a small defect 70 to be detected and an overshoot 73/an undershoot 74 occurring at a boundary of a half-tone film and glass.

A method of providing the non-sensitive band will now be described. As is shown in FIG. 38, a positive-side non-sensitive band width $DW_p$ and a negative-side non-sensitive band width $DW_m$ are set with reference to a threshold $S_{ht}$. While the input data is in the range of $DW_p$ to $DW_m$, the output is forcibly set at zero. It is desirable that the non-sensitive band width $DW_p$ and $DW_m$ be determined such that the non-sensitive band width $DW_p$ and $DW_m$ mask the amplitude levels of actual overshoot 73 and undershoot 74 but do not mask the pinhole defect 70 to be detected. Thus, the positive-side non-sensitive band width $DW_p$ may differ from the negative-side non-sensitive band width $DW_m$, or one of the non-sensitive band widths may be zero.

Figure 39:
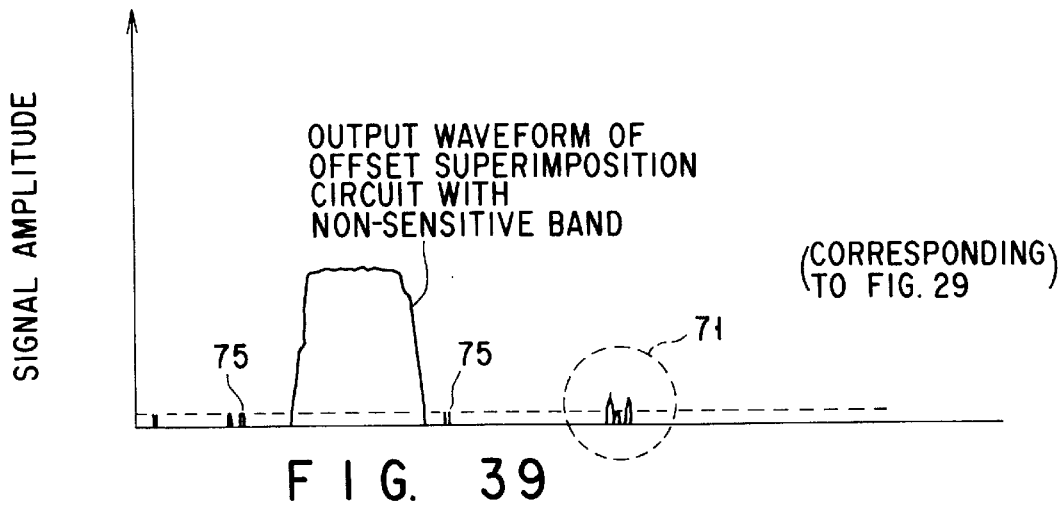

FIG. 39 shows an output from the offset superimposition circuit 69. The pinhole defective portion 70 to be detected is changed to a waveform 71 with an inverted undershoot portion, and an overshoot waveform 73 exceeding the positive-side non-sensitive band width $DW_p$ is left as a remaining waveform 75.

In the ninth embodiment, like the eighth embodiment, the amplitude adjusting circuit 66 adjusts the amplitude level of the glass transparent portion at 100%, in the rear stage of the offset superimposition circuit 69 with non-sensitive band. If necessary, the digital filter 67 is operated to obtain a waveform similar to the observed waveform of the chrome mask.

(Embodiment 10)

In a tenth embodiment of the invention, the ninth embodiment is modified such that the input/output characteristics shown in FIG. 29 are changed to those shown in FIG. 30.

The level of the threshold $S_{sh}$ determined by the transmissivity of the half-tone layer of the half-tone mask should ideally be constant over the entire mask surface. In fact, however, a certain degree of a variation appears in the level of the threshold $S_{sh}$ due to the conditions of the mask manufacturing process. It is therefore necessary to determine the non-sensitivity band widths $DW_p$ and $DW_m$ in the ninth embodiment on the basis of the amplitude level of the actual overshoot/undershoot and in consideration of a variation as a margin over the entire mask surface.

With respect to the input/output characteristics shown in FIG. 29, if the margin is too small, noise which causes erroneous detection may occur in the case where the waveform having the overshoot and undershoot drifting near the non-sensitivity band thresholds $DW_p$ and $DW_m$, as shown in FIG. 38, is processed and consequently the overshoot and undershoot fall within and without the non-sensitivity band, as shown in FIG. 39.

As compared to the input/output characteristics shown in FIG. 29, the input/output characteristics shown in FIG. 30 indicate that an offset q is subtracted from the entire output signal so as to prevent a sudden output level variation at the threshold.

Figure 40:
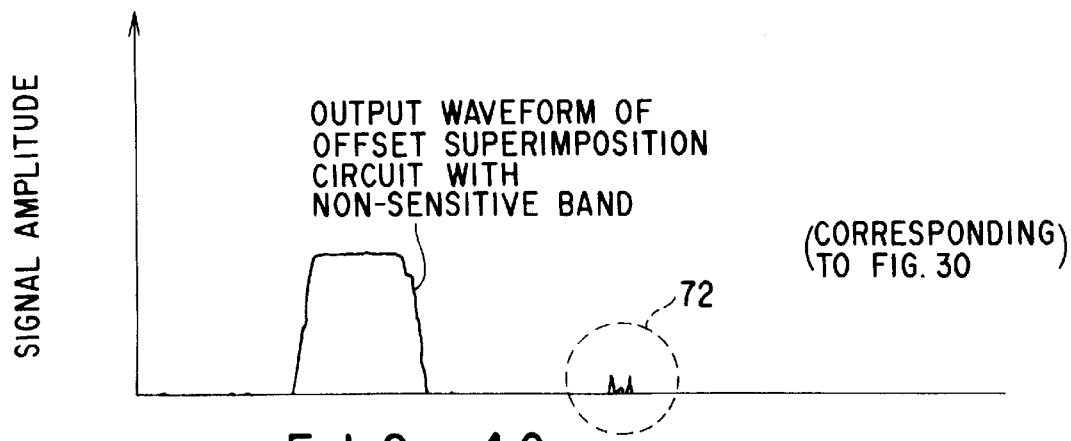

Thereby, even if the waveform having the overshoot and undershoot drifting near the non-sensitivity band thresholds $DW_p$ and $DW_m$, as shown in FIG. 38, is processed, the output waveform with no sudden variation, as shown in FIG. 40, is obtained and erroneous detection can be prevented.

In the tenth embodiment, like the eighth and ninth embodiments, the amplitude adjusting circuit 66 adjusts the amplitude level of the glass transparent portion at 100%, in the rear stage of the offset superimposition circuit 69 with non-sensitive band. If necessary, the digital filter 67 is operated to obtain a waveform similar to the observed waveform of the chrome mask.

In the ninth embodiment, as compared to the tenth embodiment, a spike noise-like sudden output level variation occurs at the threshold but a certain degree of amplitude can be maintained in the output waveform 72 of the pinhole defect 71, as compared to the output 72 of the tenth embodiment. Thus, the ninth embodiment is advantageous in determining the defect in the rear-stage comparison circuit 11. If the uniformity of the half-tone film is maintained over the entire mask surface, it is more practical that the non-sensitivity band widths $DW_p$ and $DW_m$ and offset amount q are adjusted in the ninth embodiment and the noise-free condition is obtained.

(Embodiment 11)

An eleventh embodiment of the invention relates to a method in which the inspection apparatus of the invention inspects a mask comprising both the chrome film and half-tone film.

With the structure shown in FIG. 20, the offset superimposition circuit 65 of the normalizing operation circuit 64 performs arithmetic operations so as to obtain input/output characteristics shown in FIG. 31. Specifically, three thresholds are set. A first threshold $S_{sh1}$ corresponds to a half-tone level of signal amplitude. A second threshold $S_{sh2}$ is set on the basis of the first threshold $S_{sh1}$ in consideration of an undershoot level. A third threshold $S_{sh3}$ is set on the basis of the second threshold $S_{sh2}$ in consideration of a margin for a variation over the entire mask surface. FIG. 41 shows a signal waveform with the three thresholds.

If the input level is higher than the first threshold $S_{sh1}$, the first threshold $S_{sh1}$ is subtracted from the input signal. If the input level is between the first threshold $S_{sh1}$ and the second threshold $S_{sh2}$, the input level corresponds to the undershoot of the half-tone level and is subjected to inversion to the positive side. If the input level is below the third threshold $S_{sh3}$, the input level is clamped at the chrome level. If the input level is between the second threshold $S_{sh2}$ and third threshold $S_{sh3}$, the input level corresponds to the undershoot sank in deeply of the half-tone level and in this case the amplitude is approached gradually to zero towards the third threshold $S_{sh3}$.

Figure 42:
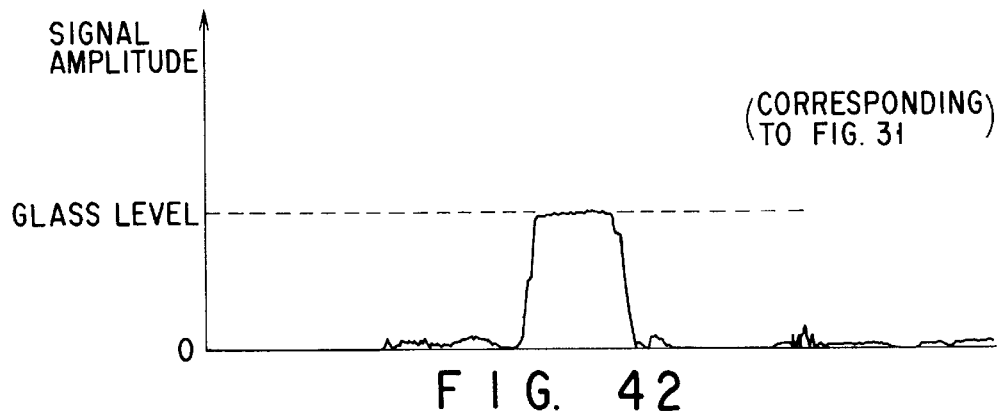

With the above characteristics, the signal shown in FIG. 41, obtained in the case of the mask comprising the chrome film and half-tone film as light shield films, becomes equivalent to the signal shown in FIG. 42 obtained in the case of the mask comprising the half-tone film alone.

In the eleventh embodiment, like the eighth to tenth embodiments, the amplitude adjusting circuit 66 adjusts the amplitude level of the glass transparent portion at 100%, in the rear stage of the offset superimposition circuit 65. If necessary, the digital filter 67 is operated to obtain the amplitude of the output from the normalizing operation circuit 64 which is equivalent to the amplitude obtained when the chrome mask is inspected.

Figure 43:
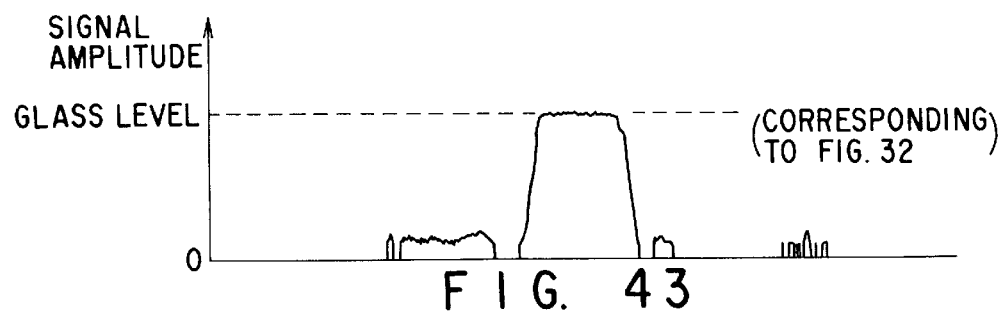

In a modification of the eleventh embodiment, the offset superimposition circuit 65 may be provided with a non-sensitive band in order to eliminate an overshoot or an undershoot near the half-tone signal level, as described in the ninth embodiment. Specifically, the input/output characteristics shown in FIG. 32 are adopted. As a result, the waveform shown in FIG. 41 changes to a waveform as shown in FIG. 43.

(Embodiment 12)

Figure 44:
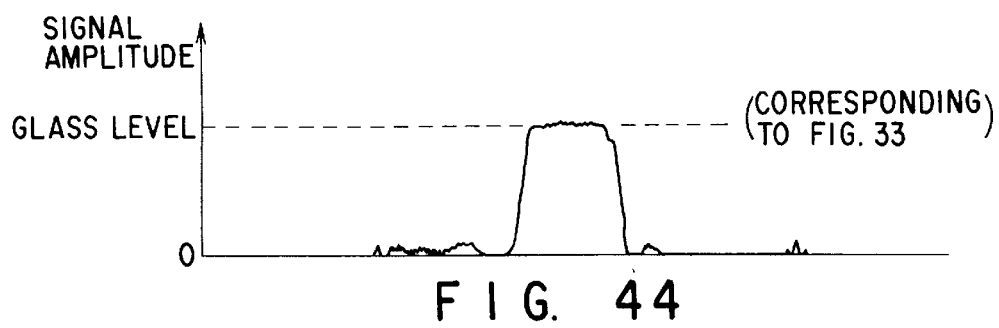

In another modification of the above-described eleventh embodiment, it can be thought to subtract an offset q from the entire output signal with respect to the waveform in which the overshoot/undershoot near the half-tone signal level drifts near the non-sensitive thresholds $DW_p$ and $DW_m$, as described in the tenth embodiment. Specifically, the input/output characteristics shown in FIG. 33 are adopted. As a result, the waveform shown in FIG. 41 changes to a waveform as shown in FIG. 44.

The non-sensitive band widths $DW_p$ and $DW_m$ shown in FIGS. 32 and 33 are determined on the basis of the amplitude level of the actual overshoot/undershoot in consideration of the variation as a margin over the entire mask surface, as was described in the ninth embodiment. In some cases, one of the non-sensitive band widths $DW_p$ and $DW_m$ may be set to zero.

The above description relates to a method of pre-processing sensor output data input to the data comparison circuit 11 of the system shown in FIG. 19 so as to approach the characteristics of the chrome mask.

The same advantage can also be obtained even if a bias corresponding to a half-tone level is applied to the design data signal input to the data comparison circuit 11, and the signal of the chrome portion is made to match with the signal of the half-tone film portion by the normalizing operation circuit 64 of the present invention, instead of the technique of approaching the signal of the half-tone portion to the signal characteristics of the chrome portion.

Figure 45:
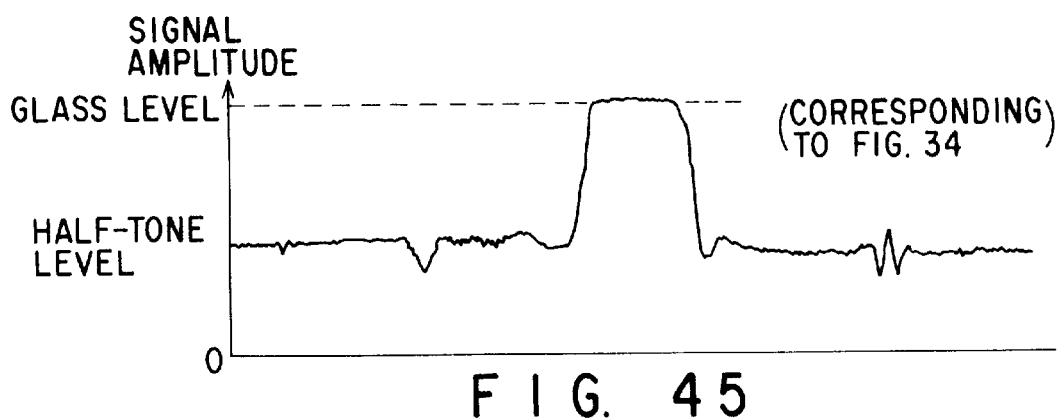

This method will now be described in a twelfth embodiment of the invention. The input/output characteristics of the offset superimposition circuit 65 shown in FIG. 20 are set to those shown in FIG. 34. Specifically, if an input signal is at a half-tone level or above, the input signal is output as it is. An undershoot component occurring near the half-tone level is reflected as an undershoot to some degree. If the input level is further below the undershoot component, the output level is gradually converged to the original half-tone level. As a result, the waveform of FIG. 41 changes to a waveform shown in FIG. 45. By the above processing, observation signals of a portion to be shieded in a mask comprising the chrome and half-tone films can be set at the half-tone level and treated.

In the twelfth embodiment, like the eighth to tenth embodiments, the amplitude adjusting circuit 66 adjusts the amplitude level of the glass transparent portion at 100%, in the rear stage of the offset superimposition circuit 65. If necessary, the digital filter 67 is operated to obtain the amplitude of the output from the normalizing operation circuit 64 which is equivalent to the amplitude obtained when the chrome mask is inspected.

(Embodiment 13)

Figure 46:
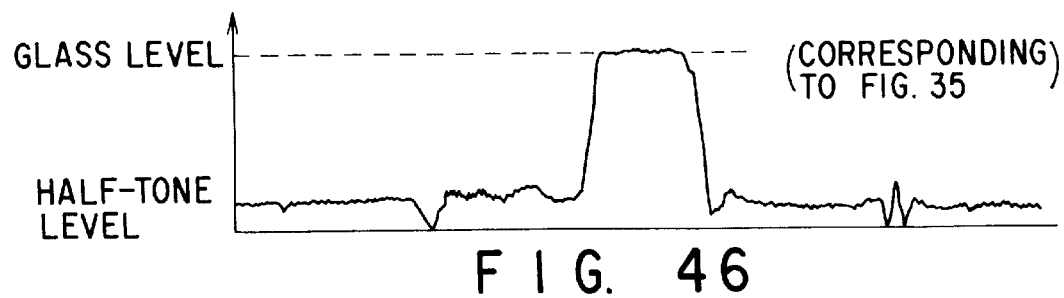
Figure 47:
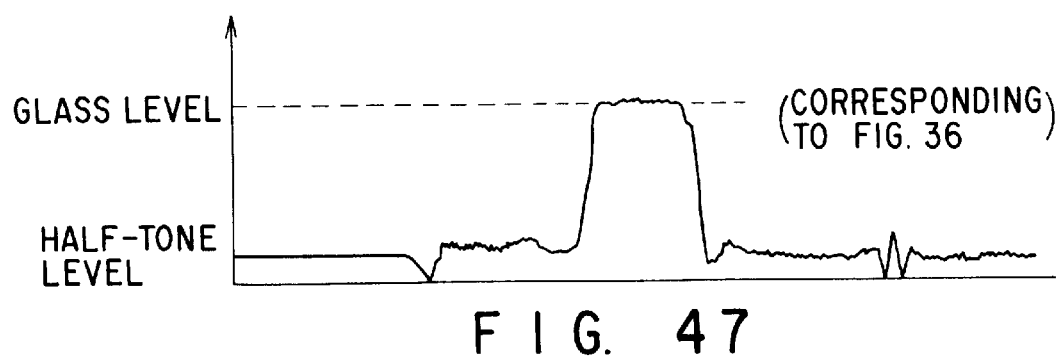
Figure 48:
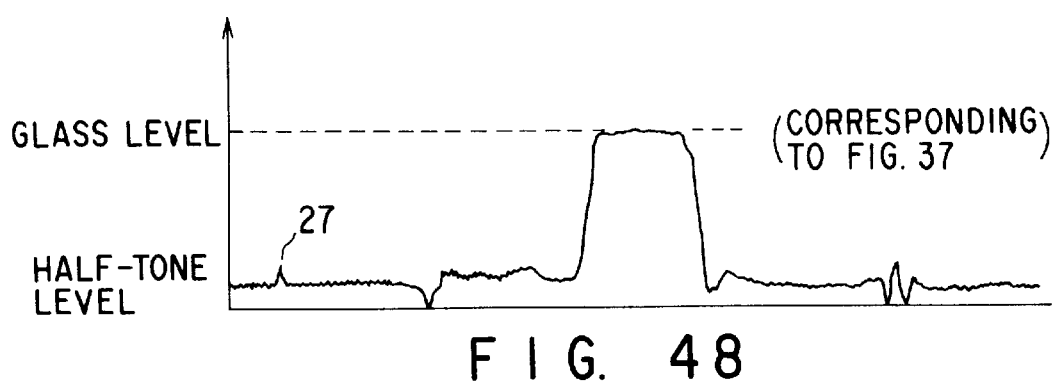

In a modification of the eleventh embodiment, the input/output characteristics of the offset superimposition circuit 65 may be altered to those shown in FIGS. 35 to 37. In any of the characteristics of FIGS. 35 to 37, the half-tone level can be matched with the chrome level. When the signal of FIG. 38 is input in the respective processing, the signal with the characteristics of FIG. 35 are converted to a signal shown in FIG. 46, the signal with the characteristics of FIG. 36 are converted to a signal shown in FIG. 47, and the signal with the characteristics of FIG. 37 are converted to a signal shown in FIG. 48.

With the characteristics of FIG. 35, since a gain decreases in relation to the signal amplitude of the chrome level portion, the pinhole defect 76 of the chrome film portion or noise decreases. With the characteristics of FIG. 36, the signal amplitude of the chrome level portion is clamped at a fixed level. Thus, the pinhole defect 76 of the chrome film portion or noise is not reflected on the output. If these characteristics are adopted, a defect of the half-tone film portion of the mask comprising the chrome and half-tone film can be indicated selectively.

With the characteristics of FIG. 37, the pinhole defect 76 of the chrome film portion included in the signal shown in FIG. 41 can be reflected on the output as a pinhole signal 77. Accordingly, if the characteristics of FIG. 37 are adopted, the defect of the black portion has an output amplitude. Thus, defects of both light shield film portions of the chrome and half-tone films of the mask can be indicated similarly.

(Embodiment 14)

Although not shown, the offset superimposition circuit having the characteristics of FIGS. 34 to 37 may be combined with a non-sensitive band as described in the ninth and tenth embodiments. In this case, the amplitude adjusting circuit 66 adjusts the amplitude level of the glass transparent portion at 100%, in the rear stage of the offset superimposition circuit 65. If necessary, the digital filter 67 is operated to obtain the amplitude of the output from the normalizing operation circuit 64 which is equivalent to the amplitude obtained when the chrome mask is inspected.

As has been described above in detail, the present invention can provide a sample inspection apparatus and a sample inspection method wherein measured image data is subjected to the operation of a template, the degree of coincidence between the measured image data and the prepared template data is found. If the degree of coincidence is very high, part of the measured image data is corrected and a signal associated with a defect is intensified or attenuated. The resultant signal is subjected to a defect determination process in a rear-stage comparative circuit. Thereby, a small defect which cannot be detected in the prior art can be detected, and the maximum detection sensitivity can be set irrespective of the type of the defect.

In addition, the present invention can provide an apparatus capable of inspecting a semi-transparent mask such as a half-tone mask which cannot be inspected in the prior art. Specifically, this invention provides a method of subjecting a sensor observation signal to proper pre-processing by using a conventional comparison detection algorithm for a chrome mask alone.

The conventional defect detection algorithm matches with only the ideal state in which the signal amplitude of a glass portion is 100% and that of a chrome portion is 0%.

In the present invention, a signal level of a target half-tone film is converted to a signal level of a chrome film, and an undershoot waveform accompanying a half-tone signal level is properly processed. Thereby, a defect can be exactly detected with a conventional comparison detection algorithm. Thus, a half-tone mask can be put to practical use. Furthermore, a light shield film comprising a conventional chrome film and a conventional half-tone film is used, a signal level of the shield film can be converted to a chrome level, thereby exactly detecting a defect with the conventional comparison detection algorithm in like manner.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A sample inspection apparatus comprising:

light radiation means for radiating light on a sample on which a pattern relating to fabrication of a semiconductor device is formed;

acquiring means for sensing the light which has passed through the sample, thereby acquiring measured image data constituting a light transmission image of said pattern;

setting means for setting a predetermined lower limit value and a predetermined upper limit value as signal amplitude values for the measured image data acquired by said acquiring means;

normalizing means for normalizing the measured image data acquired by said acquiring means such that a range of amplitude between the lower and upper limit values set by said setting means is 0% to 100% of an ideal amplitude;

clamping means for clamping a portion of the measured image data acquired by said acquiring means, which exceeds the predetermined upper limit value, with the normalized measured image data corresponding to the upper limit value;

gain multiplying means for inverting a portion of the measured image data that is lower than the lower limit value at the lower limit value and multiplying the inverted measured image data portion by a predetermined gain; and defect detection means for detecting a defect in said pattern by comparing the normalized, clamped, and multiplied measured image data and design data of the pattern.

2. The sample inspection apparatus according to claim 1, wherein the upper and lower limit values in said normalizing means are set by using one of measured image data obtained by inspecting a specified sample before or during an inspection and measured image data written from a computer for controlling the inspection apparatus.

3. The sample inspection apparatus according to claim 1, further comprising a filter for attenuating the amplitude of a high frequency band of the measured image data acquired by said acquiring means.

4. The sample inspection apparatus according to claim 3, wherein said filter is a digital filter.

5. The sample inspection apparatus according to claim 3, wherein said filter includes means for temporarily bypassing the filter.

6. A sample inspection method comprising the steps of:

radiating light on a sample on which a pattern relating to fabrication of a semiconductor device is formed;

sensing the light which has passed through the sample, thereby acquiring measured image data constituting a light transmission image of said pattern;

setting a predetermined lower limit value and a predetermined upper limit value as signal amplitude values for the measured image data acquired by said sensing step;

normalizing the measured image data acquired by said sensing step such that the range of amplitude between the predetermined lower and upper limit values set by said setting step is 0% to 100% of an ideal amplitude;

clamping a portion of the measured image data acquired by said sensing step, which exceeds the upper limit value, with the normalized measured image data corresponding to the upper limit value;

inverting a portion of the measured image data that is lower than the lower limit value at the lower limit value, and multiplying the inverted measured image data portion by a predetermined gain; and detecting a defect in said pattern by comparing the normalized, clamped, and multiplied measured image data and design data of the pattern.

7. A sample inspection apparatus comprising:

a light radiation unit for radiating light on a sample on which a pattern relating to fabrication of a semiconductor device is formed;

an acquiring unit for sensing the light which has passed through the sample, thereby acquiring measured image data constituting a light transmission image of said pattern;

a normalizing circuit including a setting section for setting a predetermined lower limit value and a predetermined upper limit value as signal amplitude values for the measured image data acquired by said acquiring unit, a normalizing section for normalizing the measured image data acquired by said acquiring unit such that a range of amplitudes between the lower and upper limit values set by said setting section is 0% to 100% of an ideal amplitude, a clamping section for clamping a portion of the measured image data acquired by said acquiring unit, which exceeds the upper limit value, with the normalized measured image data corresponding to the upper limit value, a gain multiplying section for inverting a portion of the measured image data that is lower than the lower limit value at the lower limit value and multiplying the inverted measured image data portion by a predetermined gain, and a defect detection section for detecting a defect in said pattern by comparing the normalized clamped, and multiplied image data and design data of the pattern.

8. A sample inspection apparatus comprising:

light radiation means for radiating light on a sample on which a pattern relating to fabrication of a semiconductor device is formed;

acquiring means for sensing the light which has passed through the sample, thereby acquiring measured image data constituting a light transmission image of said pattern;

setting means for setting a predetermined lower limit value as a signal amplitude value for the measured image data acquired by said acquiring means, and for setting a non-sensitive band having a signal amplitude of $\delta 1$ to a positive side and a signal amplitude of $\delta 2$ to a negative side with respect to the lower limit value;

gain multiplying means for inverting a portion of the measured image data lower than $\delta 2$ when the signal amplitude of the measured image data acquired by said acquiring means is lower than $\delta 2$, and multiplying the inverted measured image data by a predetermined gain; and clamping means for clamping the signal amplitude of a portion of the measured image data acquired by said acquiring means, which is present in said non-sensitive band, with the measured image data corresponding to the lower limit value; and defect detection means for detecting a defect in said pattern by comparing the multiplied and clamped image data and design data of the pattern.

9. The sample inspection apparatus according to claim 8, wherein the lower limit value and said signal amplitudes $\delta 1$ and δ2 in said setting means are set by using one of measured image data obtained by inspecting a specified sample before or during an inspection and measured image data received from a computer for controlling the inspection apparatus.

10. The sample inspection apparatus according to claim 8, further comprising a filter for attenuating the signal amplitude of a high frequency band of the measured image data acquired by said acquiring means.

11. The sample inspection apparatus according to claim 10, wherein said filter includes means for temporarily bypassing the filter.

12. A sample inspection apparatus comprising:
   a light radiation unit for radiating light on a sample on which a pattern relating to fabrication of a semiconductor device is formed;
   an acquiring unit for sensing the light which has passed through the sample, thereby acquiring measured image data constituting a light transmission image of said pattern; and
   a normalizing circuit including
      a setting section for setting a predetermined lower limit value as a signal amplitude value for the measured image data acquired by said acquiring unit, and for setting a non-sensitive band having a signal amplitude of δ1 to a positive side and a signal amplitude of δ2 to a negative side with respect to the lower limit value,
      a gain multiplying section for inverting a portion of the measured image data lower than δ2 when the signal amplitude of the measured image data acquired by said acquiring unit is lower than δ2, and multiplying the inverted measured image data by a predetermined gain,
      a clamping section for clamping the signal amplitude of a portion of the measured image data acquired by said acquiring unit, which is present in said non-sensitive band, with measured image data corresponding to the lower limit value, and
      a defect detection section for detecting a defect in said pattern by comparing the multiplied and clamped image data and design data of the pattern.

13. A sample inspection method comprising the steps of:
   radiating light on a sample on which a pattern relating to fabrication of a semiconductor device is formed;
   sensing the light which has passed through the sample, thereby acquiring measured image data constituting a light transmission image of said pattern;
   setting a predetermined lower limit value as a signal amplitude value for the measured image data acquired by said sensing step and setting a non-sensitive band having a signal amplitude of δ1 to a positive side and a signal amplitude of δ2 to a negative side with respect to the lower limit value;
   inverting a portion of the measured image data lower than δ2 when the signal amplitude of the measured image data acquired by said sensing step is lower than δ2, and multiplying the inverted measured image data by a predetermined gain;
   clamping the signal amplitude of a portion of the measured image data acquired by said sensing step, which is present in said non-sensitive band, with normalized measured image data corresponding to the lower limit value; and
   detecting a defect in said pattern by comparing the multiplied and clamped image data and design data of the pattern.

14. A sample inspection apparatus comprising:
   light radiation means for radiating light on a sample on which a pattern relating to fabrication of a semiconductor device is formed;
   acquiring means for sensing the light which has passed through the sample, thereby acquiring measured image data constituting a light transmission image of said pattern;
   lower limit value setting means for setting a predetermined lower limit value for the measured image data acquired by said acquiring means;
   threshold setting means for setting a predetermined threshold on a negative side of the predetermined lower limit value set by said lower limit value setting means;
   gain multiplying means for inverting the measured image at the lower limit value when a signal amplitude of the measured image data is between said lower limit value and said threshold, and multiplying the inverted measured image data by a predetermined gain;
   adjusting means for bias-clamping, when the signal amplitude of the measured image data is lower than said threshold, the measured image data with normalized measured image data corresponding to the threshold, or attenuating the measured image data lower than said threshold such that a signal value of the measured image data decreases gradually to 0% of the normalized measured image data, to obtain corrected measured image data; and
   defect detection means for detecting a defect in said pattern by comparing the multiplied and corrected measured image data and design data of the pattern.

15. The sample inspection apparatus according to claim 14, wherein the lower limit value and said threshold are set by using one of measured image data obtained by inspecting a specified sample before or during an inspection and measured image data received from a computer for controlling the inspection apparatus.

16. The sample inspection apparatus according to claim 14, further comprising a filter for attenuating the signal amplitude of a high frequency band of the measured image data acquired by said acquiring means.

17. The sample inspection apparatus according to claim 16, wherein said filter includes means for temporarily bypassing the filter.

18. A sample inspection apparatus comprising:
   a light radiation unit for radiating light on a sample on which a pattern relating to fabrication of a semiconductor device is formed;
   an acquiring unit for sensing the light which has passed through the sample, thereby acquiring measured image data constituting a light transmission image of said pattern; and
   a normalizing circuit including
      a lower limit value setting section for setting a predetermined lower limit value for the measured image data acquired by said acquiring unit,
      a threshold setting section for setting a predetermined threshold on a negative side of the lower limit value set by said lower limit value setting section,
      a gain multiplying section for inverting the measured image at the lower limit value when a signal amplitude of the measured image data is between said lower limit value and said threshold, and multiplying the inverted measured image data by a predetermined gain, an adjusting section for bias-clamping, when the signal amplitude of the measured image data is lower than said threshold, the measured image data with normalized measured image data corresponding to the threshold, or attenuating the measured image data lower than said threshold such that a signal value of the measured image data decreases gradually to 0% of the normalized measured image data to obtain corrected measured image data, and a defect detection section for detecting a defect in said pattern by comparing the multiplied and corrected measured image data and design data of the pattern.

19. A sample inspection method comprising the steps of:

radiating light on a sample on which a pattern relating to fabrication of a semiconductor device is formed;

sensing the light which has passed through the sample, thereby acquiring measured image data constituting a light transmission image of said pattern;

setting a predetermined lower limit value for the measured image data acquired by said sensing step;

setting a predetermined threshold on a negative side of the lower limit value set by said setting step;

inverting the measured image at the lower limit value when a signal amplitude of the measured image data is between said lower limit value and said threshold, and multiplying the inverted measured image data by a predetermined gain;

bias-clamping, when the signal amplitude of the measured image data is lower than said threshold, the measured image data with normalized measured image data corresponding to the threshold, or attenuating the measured image data lower than said threshold such that a signal value of the measured image data decreases gradually to 0% of the normalized measured image data to obtain corrected measured image data; and detecting a defect in said pattern by comparing the multiplied and corrected measured image data and design data of the pattern.

20. A sample inspection apparatus comprising:

light radiation means for radiating light on a sample on which a pattern relating to fabrication of a semiconductor device is formed;

acquiring means for sensing the light which has passed through the sample, thereby acquiring measured image data constituting a light transmission image of said pattern;

lower limit value setting means for setting a predetermined lower limit value for the measured image data acquired by said acquiring means;

threshold setting means for setting a predetermined first threshold and a predetermined second threshold on a negative side of said lower limit value;

gain multiplying means for inverting a portion of the measured image data lower than the lower limit value at the lower limit value when a signal amplitude of the measured image data is between said predetermined lower limit value and said first threshold, and multiplying the inverted measured image data by a predetermined gain;

shifting means for shifting the signal amplitude of the measured image data to zero toward the second threshold when the signal amplitude of the measured image data is between the first threshold and the second threshold;

bias-clamping means for bias-clamping the measured image data at a chrome level when the signal amplitude of the measured image data is below the second threshold to obtain corrected measured image data; and defect detection means for detecting a defect in said pattern by comparing the multiplied, shifted, and corrected measured image data and design data of the pattern.

21. The sample inspection apparatus according to claim 20, wherein the lower limit value and said first and second thresholds in said threshold setting means are set by using one of measured image data obtained by inspecting a specified sample before or during an inspection and measured image data received from a computer for controlling the inspection apparatus.

22. The sample inspection apparatus according to claim 20, further comprising a filter for attenuating the signal amplitude of a high frequency band of the measured image data acquired by said acquiring means.

23. The sample inspection apparatus according to claim 22, wherein said filter includes means for temporarily bypassing the filter.

24. A sample inspection apparatus comprising:

a light radiation unit for radiating light on a sample on which a pattern relating to fabrication of a semiconductor device is formed;

an acquiring unit for sensing the light which has passed through the sample, thereby acquiring measured image data constituting a light transmission image of said pattern; and a normalizing circuit including
lower limit value setting means for setting a predetermined lower limit value for the measured image data acquired by said acquiring means,
a threshold setting section for setting a predetermined first threshold and a predetermined second threshold on a negative side of said lower limit value,
a gain multiplying section for inverting a portion of the measured image data lower than the lower limit value at the lower limit value when a signal amplitude of the measured image data is between said lower limit value and said first threshold, and multiplying the inverted measured image data by a predetermined gain,
a shifting section for shifting the signal amplitude of the measured image data to zero toward the second threshold when the signal amplitude of the measured image data is between the first threshold and the second threshold,
a bias-clamping section for bias-clamping the measured image data at a chrome level when the signal amplitude of the measured image data is below the second threshold to obtain corrected measured image data, and
a defect detection section for detecting a defect in said pattern by comparing the multiplied, shifted, and corrected measured image data and design data of the pattern.

25. A sample inspection method comprising the steps of radiating light on a sample on which a pattern relating to fabrication of a semiconductor device is formed;

sensing the light which has passed through the sample, thereby acquiring measured image data constituting a light transmission image of said pattern;

setting a predetermined lower limit value for the measured image data acquired by said sensing step;

setting a predetermined first threshold and a predetermined second threshold on a negative side of said lower limit value;

inverting a portion of the measured image data lower than the lower limit value at the lower limit value when a signal amplitude of the measured image data is between said predetermined lower limit value and said first threshold, and multiplying the inverted measured image data by a predetermined gain;

shifting the signal amplitude of the measured image data to zero toward the second threshold when the signal amplitude of the measured image data is between the first threshold and the second threshold;

bias-clamping the measured image data at a chrome level when the signal amplitude of the measured image data is below the second threshold to obtain corrected measured image data; and detecting a defect in said pattern by comparing the multiplied, shifted, and corrected measured image data and design data of the pattern.

26. A sample inspection apparatus comprising:

light radiation section for radiating light on a sample on which a pattern relating to fabrication of a semiconductor device is formed;

an acquiring section for sensing the light which has passed through the sample, thereby acquiring measured image data constituting a light transmission image of said pattern;

a storage section for storing the measured image data acquired by said acquiring section;

a pinhole detection section for detecting a pinhole in said pattern on the basis of the measured image data stored in said storage section, said pinhole detection section comprising an extraction circuit for extracting a value of a center pixel of the measured image data stored in said storage section and values of pixels surrounding the center pixel in a multiple manner, a determination circuit for determining the presence of the pinhole in said pattern by a difference between the value of the center pixel extracted by said extraction circuit and the values of the surrounding pixels, and a filter for filtering said measured image data which includes the determined pinhole so as to attenuate a high frequency band amplitude of said measured image data including the determined pinhole;

a defect detection section for detecting a defect in said pattern on the basis of the filtered measured image data, including the determined pinhole, which is obtained by said filter, and said measured image data; and an output section for outputting a detection result of said defect detection section.

27. A sample inspection apparatus according to claim 26, wherein said filter is one of a FIR filter and an IIR filter.

28. A sample inspection apparatus according to claim 26, further comprising:

a setting section for setting a predetermined lower limit value and a predetermined upper limit value as signal amplitude values for the measured image data filtered by said filter;

normalizing means for normalizing the measured image data filtered by said filter such that a range of amplitude between the lower and upper limit values set by said setting section is 0% to 100% of an ideal amplitude;

a clamping section for clamping a portion of the measured image data filtered by said filter which exceeds the upper limit value with the normalized measured image data corresponding to the upper limit value; and a gain multiplying section for inverting a portion of the measured image data that is lower than the lower limit value at the lower limit value and multiplying the inverted measure image data portion by a predetermined gain, thereby providing the inverted measured image data as the filtered measured image data portion in the defect detection section.

* * * * *

UNITED STATES PATENT AND TRADEMARK OFFICE
CERTIFICATE OF CORRECTION

PATENT NO. : 5,960,106
DATED : September 28, 1999
INVENTOR(S) : Hideo Tsuchiya et al.

It is certified that error appears in the above-identified patent and that said Letters Patent is hereby corrected as shown below:

Claim 7, col. 24, line 35, after "normalized", insert --,--.

Claim 25, col. 29, line 17, after "multiplied", insert --,--.

Signed and Sealed this

Fifteenth Day of August, 2000

Attest:

Q. TODD DICKINSON

*Attesting Officer*         *Director of Patents and Trademarks*